US 12,333,800 B2

(12) United States Patent
Xiao et al.

(10) Patent No.: US 12,333,800 B2
(45) Date of Patent: Jun. 17, 2025

(54) SYSTEM AND METHOD FOR MAPPING LAND COVER TYPES WITH LANDSAT, SENTINEL-1, AND SENTINEL-2 IMAGES

(71) Applicant: The Board of Regents of the University of Oklahoma, Norman, OK (US)

(72) Inventors: Xiangming Xiao, Norman, OK (US); Jie Wang, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 350 days.

(21) Appl. No.: 17/828,539

(22) Filed: May 31, 2022

(65) Prior Publication Data

US 2022/0392215 A1    Dec. 8, 2022

Related U.S. Application Data

(60) Provisional application No. 63/194,332, filed on May 28, 2021.

(51) Int. Cl.
  *G06V 10/56*    (2022.01)
  *G06T 7/70*    (2017.01)
  (Continued)

(52) U.S. Cl.
  CPC .............. *G06V 20/188* (2022.01); *G06T 7/70* (2017.01); *G06V 10/26* (2022.01); *G06V 10/56* (2022.01);
  (Continued)

(58) Field of Classification Search
  CPC ...... G06V 20/188; G06V 10/26; G06V 10/56; G06V 10/764; G06T 7/70;
  (Continued)

(56) References Cited

U.S. PATENT DOCUMENTS

2014/0368507 A1* 12/2014 Altman ................... G06T 17/05
  345/426
2016/0171279 A1*  6/2016 Haglund ................ G06T 17/05
  382/224

(Continued)

OTHER PUBLICATIONS

Aguiar, D.A.,(2011). Remote Sensing Images in Support of Environmental Protocol: Monitoring the Sugarcane Harvest in Sao Paulo State, Brazil. *Remote Sensing*, 3, 2682-2703.

(Continued)

*Primary Examiner* — Stephen P Coleman
(74) *Attorney, Agent, or Firm* — DUNLAP CODDING, P.C.

(57) ABSTRACT

A computer system having a processor executing a set of instructions that cause the processor to receive first image data having pixel information of a geographic region; calculate for particular real-world locations within the geographic region, a plurality of vegetation indices with combinations of the pixel information; generate a land cover mask with the vegetation indices, the land cover mask identifying first real-world locations within the geographic region having a water-related land cover type, a non-vegetated land cover type and an evergreen land cover type; classify second real-world locations within the geographic region that are not classified as the water-related land cover type, the non-vegetated land cover type and the evergreen land cover type as cropland; and analyze a time-series of image data depicting the second real-world locations within the geographic region with phenology metrics to identify at least one particular type of cropland within the second real-world locations.

20 Claims, 14 Drawing Sheets
(6 of 14 Drawing Sheet(s) Filed in Color)

(51) Int. Cl.
*G06V 10/26* (2022.01)
*G06V 10/764* (2022.01)
*G06V 20/10* (2022.01)

(52) U.S. Cl.
CPC .. *G06V 10/764* (2022.01); *G06T 2207/10024* (2013.01); *G06T 2207/10048* (2013.01); *G06T 2207/20081* (2013.01); *G06T 2207/30188* (2013.01)

(58) Field of Classification Search
CPC . G06T 2207/10024; G06T 2207/10048; G06T 2207/20081; G06T 2207/30188; Y02E 50/10
USPC .......................................................... 382/110
See application file for complete search history.

(56) References Cited

U.S. PATENT DOCUMENTS

2021/0012109 A1* 1/2021 Chou ................... G06V 10/752
2021/0209803 A1* 7/2021 Jha ...................... G06F 18/2431

OTHER PUBLICATIONS

Baghdadi, N., (2011). Multitemporal observations of sugarcane by TerraSAR-X sensor. In, 2011 *IEEE International Geoscience and Remote Sensing Symposium* (pp. 1401-1404.
Bargiel, D. (2017). A new method for crop classification combining time series of radar images and crop phenology information. *Remote Sensing of Environment*, 198, 369-383.
Begue, A., (2018). Remote Sensing and Cropping Practices: A Review. *Remote Sensing*, 10.
Bioresita, F., , J.-P. (2018). A method for automatic and rapid mapping of water surfaces from sentinel-1 imagery. *Remote Sensing*, 10, 217.
Cardona, C.A.,. (2010). Production of bioethanol from sugarcane bagasse: Status and perspectives. *Bioresource Technology*, 101, 4754-4766.
Chen, B.Q., (2018a). Mapping Forest and Their Spatial-Temporal Changes From 2007 to 2015 in Tropical Hainan Island by Integrating ALOS/ALOS-2 L-Band SAR and Landsat Optical Images. *Ieee Journal of Selected Topics in Applied Earth Observations and Remote Sensing*, 11, 852-867.
Chen, J.S., (2011). Mapping rice planting areas in southern China using the China Environment Satellite data. *Mathematical and Computer Modelling*, 54, 1037-1043.
Chen, Y.L., (2018b). Mapping croplands, cropping patterns, and crop types using MODIS time-series data. *International Journal of Applied Earth Observation and Geoinformation*, 69, 133-147.
Defante, L.R., (2018). Rapid expansion of sugarcane crop for biofuels and influence on food production in the first producing region of Brazil. *Food Policy*, 79, 121-131.
Defourny, P., (2019). Near real-time agriculture monitoring at national scale at parcel resolution: Performance assessment of the Sen2-Agri automated system in various cropping systems around the world. *Remote Sensing of Environment*, 221, 551-568.
Defries, R.S., (1994). Ndvi-Derived Land-Cover Classifications at a Global-Scale. *International Journal of Remote Sensing*, 15, 3567-3586.
Di Vittorio, C.A., (2018). Land cover classification and wetland inundation mapping using MODIS. *Remote Sensing of Environment*, 204, 1-17.
Dong, J.W., (2015). Tracking the dynamics of paddy rice planting area in 1986-2010 through time series Landsat images and phenology-based algorithms. *Remote Sensing of Environment*, 160, 99-113.
El Hajj, M., (2009). Integrating SPOT-5 time series, crop growth modeling and expert knowledge for monitoring agricultural practices—The case of sugarcane harvest on Reunion Island. *Remote Sensing of Environment*, 113, 2052-2061.

Fischer, G., Global Agro-ecological Assessment for Agriculture in the 21st Century; Methodology and Results. International Institute for Applied Systems Analysis. (Mar. 2002).
Galford, G.L., (2008). Wavelet analysis of MODIS time series to detect expansion and intensification of row-crop agriculture in Brazil. *Remote Sensing of Environment*, 112, 576-587.
Gao, F., Anderson, (2017). Toward mapping crop progress at field scales through fusion of Landsat and MODIS imagery. *Remote Sensing of Environment*, 188, 9-25.
Gong, P., (2013). Finer resolution observation and monitoring of global land cover: first mapping results with Landsat TM and ETM+ data. *International Journal of Remote Sensing*, 34, 2607-2654.
Griffiths, P., (2019). Intra-annual reflectance composites from Sentinel-2 and Landsat for national-scale crop and land cover mapping. *Remote Sensing of Environment*, 220, 135-151.
Hansen, M.C., (2016). Mapping tree height distributions in Sub-Saharan Africa using Landsat 7 and 8 data. *Remote Sensing of Environment*, 185, 221-232.
Hu, S., Shi, (2019). Improvement of sugarcane crop simulation by SWAP-WOFOST model via data assimilation. *Field Crops Research*, 232, 49-61.
Huete, A., (2002). Overview of the radiometric and biophysical performance of the MODIS vegetation indices. *Remote Sensing of Environment*, 83, 195-213.
Hurni, K., (2017). Mapping the Expansion of Boom Crops in Mainland Southeast Asia Using Dense Time Stacks of Landsat Data. *Remote Sensing*, 9.
Jackson, T.J., (2004). Vegetation water content mapping using Landsat data derived normalized difference water index for corn and soybeans. *Remote Sensing of Environment*, 92, 475-482.
Jiang, H., (2019a). Early Season Mapping of Sugarcane by Applying Machine Learning Algorithms to Sentinel-1A/2 Time Series Data: A Case Study in Zhanjiang City, China. *Remote Sensing*, 11.
Jiang, M., (2019b). Decreasing Rice Cropping Intensity in Southern China from 1990 to 2015. *Remote Sensing*, 11, 35.
Jin, Z.N., Azzari, (2019). Smallholder maize area and yield mapping at national scales with Google Earth Engine. *Remote Sensing of Environment*, 228, 115-128.
Johnson, B.A., (2014). An ensemble pansharpening approach for finer-scale mapping of sugarcane with Landsat 8 imagery. *International Journal of Applied Earth Observation and Geoinformation*, 33, 218-225.
Jonsson, P., (2004). TIMESAT—a program for analyzing time-series of satellite sensor data. *Computers & Geosciences*, 30, 833-845.
Li, L., Friedl, (2014). Mapping Crop Cycles in China Using MODIS-EVI Time Series. *Remote Sensing*, 6, 2473-2493.
Lin, H., (2009). Monitoring Sugarcane Growth Using ENVISAT ASAR Data. *IEEE Transactions on Geoscience and Remote Sensing*, 47, 2572-2580.
Liu, L., (2020). Mapping cropping intensity in China using time series Landsat and Sentinel-2 images and Google Earth Engine. *Remote Sensing of Environment*, 239, 111624.
Loveland, T.R., (2012). Landsat: Building a strong future. *Remote Sensing of Environment*, 122, 22-29.
Luciano, A.C.D., (2019). A generalized space-time OBIA classification scheme to map sugarcane areas at regional scale, using Landsat images time-series and the random forest algorithm. *International Journal of Applied Earth Observation and Geoinformation*, 80, 127-136.
Luciano, A.C.d.S., (2018). Generalized space-time classifiers for monitoring sugarcane areas in Brazil. *Remote Sensing of Environment*, 215, 438-451.
Massey, R., (2017). MODIS phenology-derived, multi-year distribution of conterminous US crop types. *Remote Sensing of Environment*, 198, 490-503.
Meng, E.C. (2006). *Maize in China: Production systems, constraints, and research priorities*. Cimmyt.
Molijn, R.A., (2018). Ground reference data for sugarcane biomass estimation in São Paulo state, Brazil. *Scientific Data*, 5, 180150.
Moore, P.H., (2014). *Sugarcane: physiology, biochemistry and functional biology*. John Wiley & Sons.

(56) References Cited

OTHER PUBLICATIONS

Mulianga, B., (2015). Mapping Cropping Practices of a Sugarcane-Based Cropping System in Kenya Using Remote Sensing. *Remote Sensing*, 7, 14428-14444.
Olofsson, P.,. (2014). Good practices for estimating area and assessing accuracy of land change. *Remote Sensing of Environment*, 148, 42-57.
Pena-Barragan, (2011). Object-based crop identification using multiple vegetation indices, textural features and crop phenology. *Remote Sensing of Environment*, 115, 1301-1316.
Qin, Y., (2017a). Quantifying annual changes in built-up area in complex urban-rural landscapes from analyses of PALSAR and Landsat images. *Isprs Journal of Photogrammetry and Remote Sensing*, 124, 89-105.
Qin, Y.W., (2017b). Annual dynamics of forest areas in South America during 2007-2010 at 50m spatial resolution. *Remote Sensing of Environment*, 201, 73-87.
Qiu, B.W., (2017). Winter wheat mapping combining variations before and after estimated heading dates. *Isprs Journal of Photogrammetry and Remote Sensing*, 123, 35-46.
Roy, D.P., (2016). Characterization of Landsat-7 to Landsat-8 reflective wavelength and normalized difference vegetation index continuity. *Remote Sensing of Environment*.
Roy, D.P., (2014). Landsat-8: Science and product vision for terrestrial global change research. *Remote Sensing of Environment*, 145, 154-172.
Rudorff, B.F.T., (2010). Studies on the Rapid Expansion of Sugarcane for Ethanol Production in Sao Paulo State (Brazil) Using Landsat Data. *Remote Sensing*, 2, 1057-1076.
Samberg, L.H., (2016). Subnational distribution of average farm size and smallholder contributions to global food production. *Environmental Research Letters*, 11.
Shao, Z.F., (2019). Deep learning-based fusion of Landsat-8 and Sentinel-2 images for a harmonized surface reflectance product. *Remote Sensing of Environment*, 235.
Shield, I. (2016). 11—Sugar and starch crop supply chains. In J.B. Holm-Nielsen, & E.A. Ehimen (Eds.), *Biomass Supply Chains for Bioenergy and Biorefining* (pp. 249-269): Woodhead Publishing.
Sidike, P., (2019). dPEN: deep Progressively Expanded Network for mapping heterogeneous agricultural landscape using WorldView-3 satellite imagery. *Remote Sensing of Environment*, 221, 756-772.
Silalertruksa, T (2018). Land-water-energy nexus of sugarcane production in Thailand. *Journal of Cleaner Production*, 182, 521-528.
Sindhu, R., (2016). Bioconversion of sugarcane crop residue for value added products—An overview. *Renewable Energy*, 98, 203-215.
Song, Y., (2019). Mapping Winter Wheat Planting Area and Monitoring Its Phenology Using Sentinel-1 Backscatter Time Series. *Remote Sensing*, 11.
Torriani, D.S., (2007). Potential effects of changes in mean climate and climate variability on the yield of winter and spring crops in Switzerland. *Climate Research*, 34, 59-69.
Tucker, C.J. (1979). Red and Photographic Infrared Linear Combinations for Monitoring Vegetation. *Remote Sensing of Environment*, 8, 127-150.
Verma, A.K., (2017). Sugarcane crop identification from LISS IV data using ISODATA, MLC, and indices based decision tree approach. *Arabian Journal of Geosciences*, 10.
Vieira, M.A., (2012). Object Based Image Analysis and Data Mining applied to a remotely sensed Landsat time-series to map sugarcane over large areas. *Remote Sensing of Environment*, 123, 553-562.
Vinod, K.V.K., (2010). Development of Spectral Signatures and Classification of Sugarcane using ASTER Data. *International Journal of Computer Science & Communication*, 1, 245-251.
Wang, J., (2014). Identification of sugarcane based on object-oriented analysis using time-series HJ CCD data. *Transactions of the Chinese Society of Agricultural Engineering*, 30, 145-151.

Wang, J., (2018a). Characterizing the encroachment of juniper forests into sub-humid and semi-arid prairies from 1984 to 2010 using PALSAR and Landsat data. *Remote Sensing of Environment*, 205, 166-179.
Wang, L.H., (2018b). Acceleration of global vegetation greenup from combined effects of climate change and human land management. *Global change biology*, 24, 5484-5499.
Wang, S., (2019). Crop type mapping without field-level labels: Random forest transfer and unsupervised clustering techniques. *Remote Sensing of Environment*, 222, 303-317.
Wardlow, B.D., (2007). Analysis of time-series MODIS 250 m vegetation index data for crop classification in the US Central Great Plains. *Remote Sensing of Environment*, 108, 290-310.
Xavier, A.C., (2006). Multi-temporal analysis of MODIS data to classify sugarcane crop. *International Journal of Remote Sensing*, 27, 755-768.
Xiao, X.M., (2006). Mapping paddy rice agriculture in South and Southeast Asia using multi-temporal MODIS images. *Remote Sensing of Environment*, 100, 95-113.
Xiao, X.M.,(2005). Mapping paddy rice agriculture in southern China using multi-temporal MODIS images. *Remote Sensing of Environment*, 95, 480-492.
Xu, H. (2006). Modification of normalised difference water index (NDWI) to enhance open water features in remotely sensed imagery. *International Journal of Remote Sensing*, 27, 3025-3033.
Zhang, G., Xiao, (2017). Spatiotemporal patterns of paddy rice croplands in China and India from 2000 to 2015. *Science of the Total Environment*, 579, 82-92.
Zhang, H.K., (2018). Characterization of Sentinel-2A and Landsat-8 top of atmosphere, surface, and nadir BRDF adjusted reflectance and NDVI differences. *Remote Sensing of Environment*, 215, 482-494.
Zhong, L., (2011). A phenology-based approach to map crop types in the San Joaquin Valley, California. *International Journal of Remote Sensing*, 32, 7777-7804.
Zhong, L., (2016a). Automated mapping of soybean and corn using phenology. *Isprs Journal of Photogrammetry and Remote Sensing*, 119, 151-164.
Zhong, (2014). Efficient corn and soybean mapping with temporal extendability: A multi-year experiment using Landsat imagery. *Remote Sensing of Environment*, 140, 1-13.
Zhong, L.H.,(2016b). Automated mapping of soybean and corn using phenology. *Isprs Journal of Photogrammetry and Remote Sensing*, 119, 151-164.
Zhong, L.H., (2019). Deep learning based multi-temporal crop classification. *Remote Sensing of Environment*, 221, 430-443.
Zhou, Z., (2015). Object-Oriented Classification of Sugarcane Using Time-Series Middle-Resolution Remote Sensing Data Based on AdaBoost. *PLoS ONE*, 10.
Zhu, Z., (2012). Object-based cloud and cloud shadow detection in Landsat imagery. *Remote Sensing of Environment*, 118, 83-94.
Zou, Z.H., (2018). Divergent trends of open-surface water body area in the contiguous United States from 1984 to 2016. *Proceedings of the National Academy of Sciences of the United States of America*, 115, 3810-3815.
Sage, R.F., Chapter 6: Photosynthesis in Sugarcane. Sugarcane: Physiology, Biochemistry, and Functional Biology (1st ed.) (2014).
Wang, J.,Mapping sugarcane plantation dynamics in Guangxi, China, by time series Sentinel-1, Sentinel-2 and Landsat images. Remote Sensing of Environment 247 (2020) 111951.
Qin, Y.W.,(2019). Improved estimates of forest cover and loss in the Brazilian Amazon in 2000-2017. *Nature Sustainability*, 2, 764-772.
Zhang, B.-Q., (2015). Physiological and biochemical characteristics related to cold resistance in sugarcane. *Sugar Tech*, 17, 49-58.
Xiao, X., (2009). A Simple Algorithm for Large-Scale Mapping of Evergreen Forests in Tropical America, Africa and Asia. *Remote Sensing*, 1, 355-374.
Henry, F.,(2017). Sugarcane land classification with satellite imagery using logistic regression model. In, *IOP Conference Series: Materials Science and Engineering* (p. 012024): IOP Publishing.

\* cited by examiner

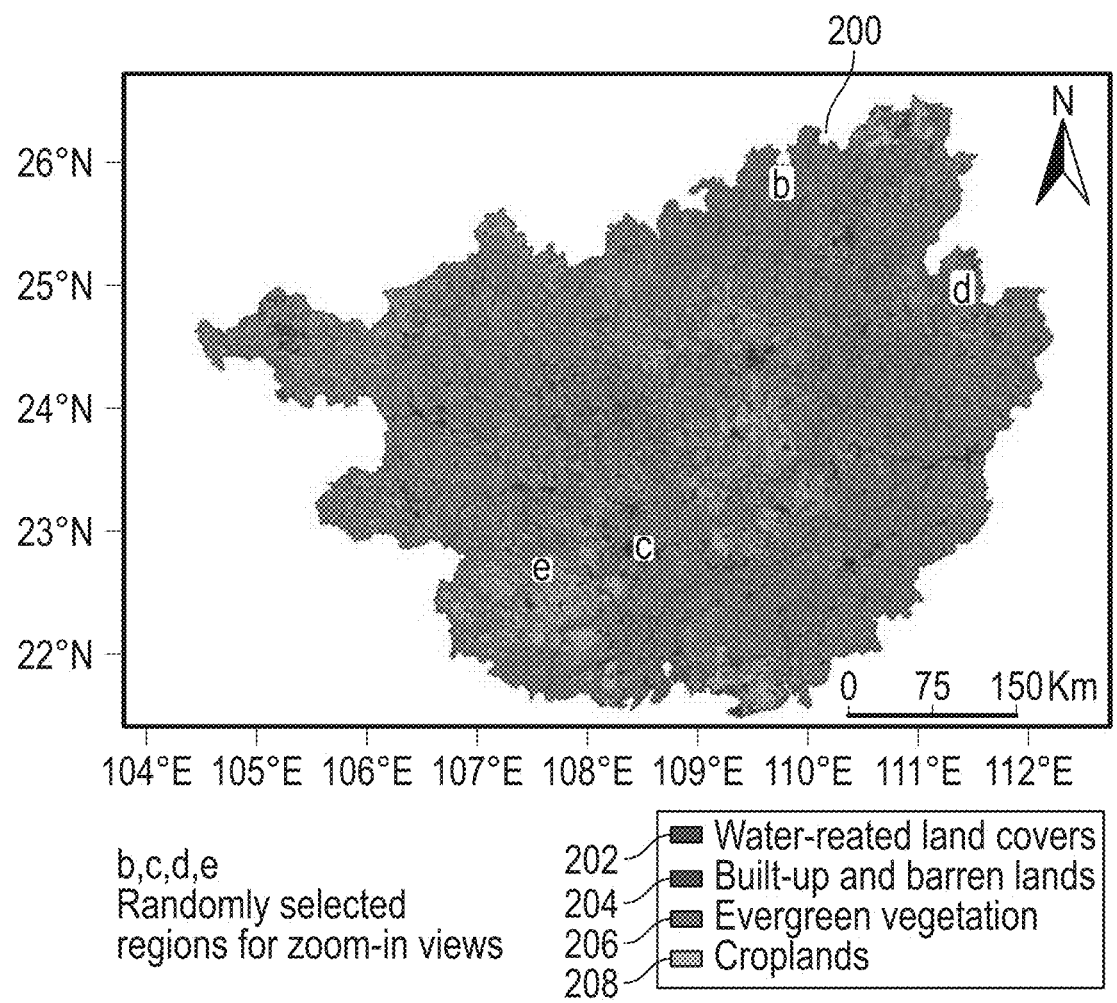
b,c,d,e
Randomly selected
regions for zoom-in views
202 — Water-reated land covers
204 — Built-up and barren lands
206 — Evergreen vegetation
208 — Croplands
FIG. 4A
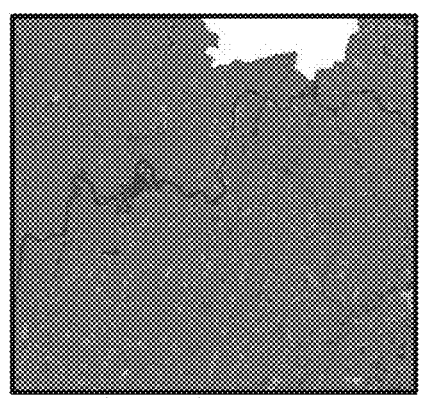
FIG. 4B1
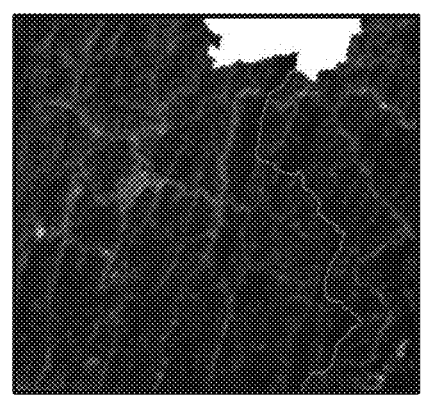
FIG. 4B2

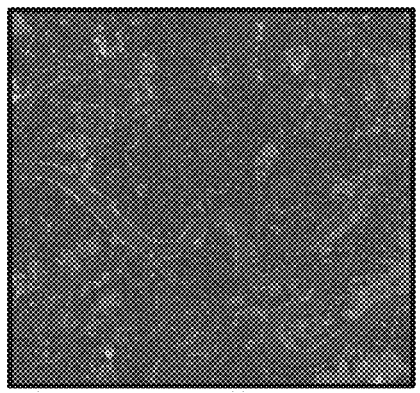
FIG. 4C1
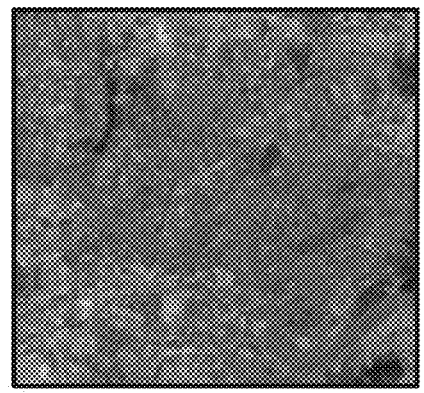
FIG. 4C2
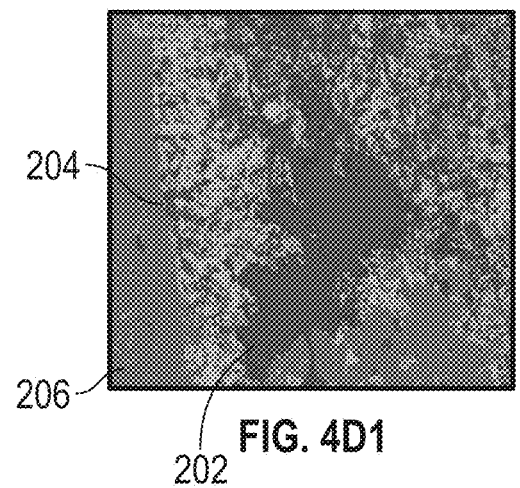
FIG. 4D1
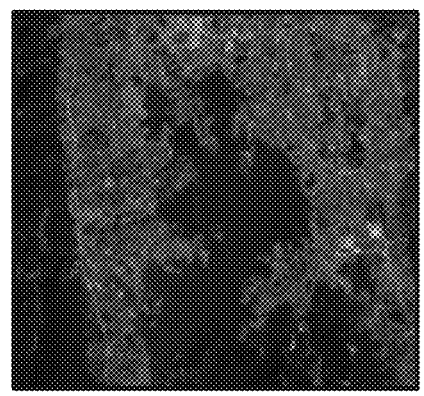
FIG. 4D2
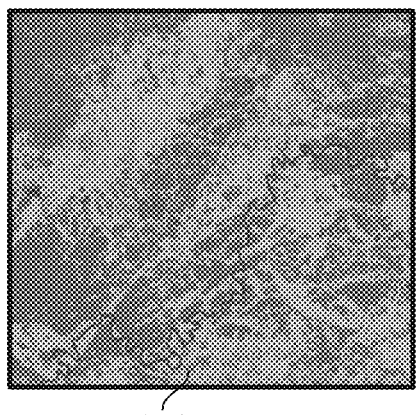
FIG. 4E1
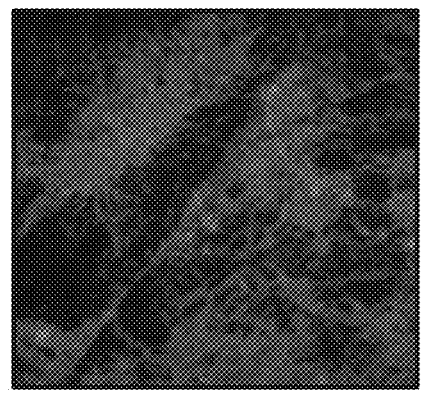
FIG. 4E2

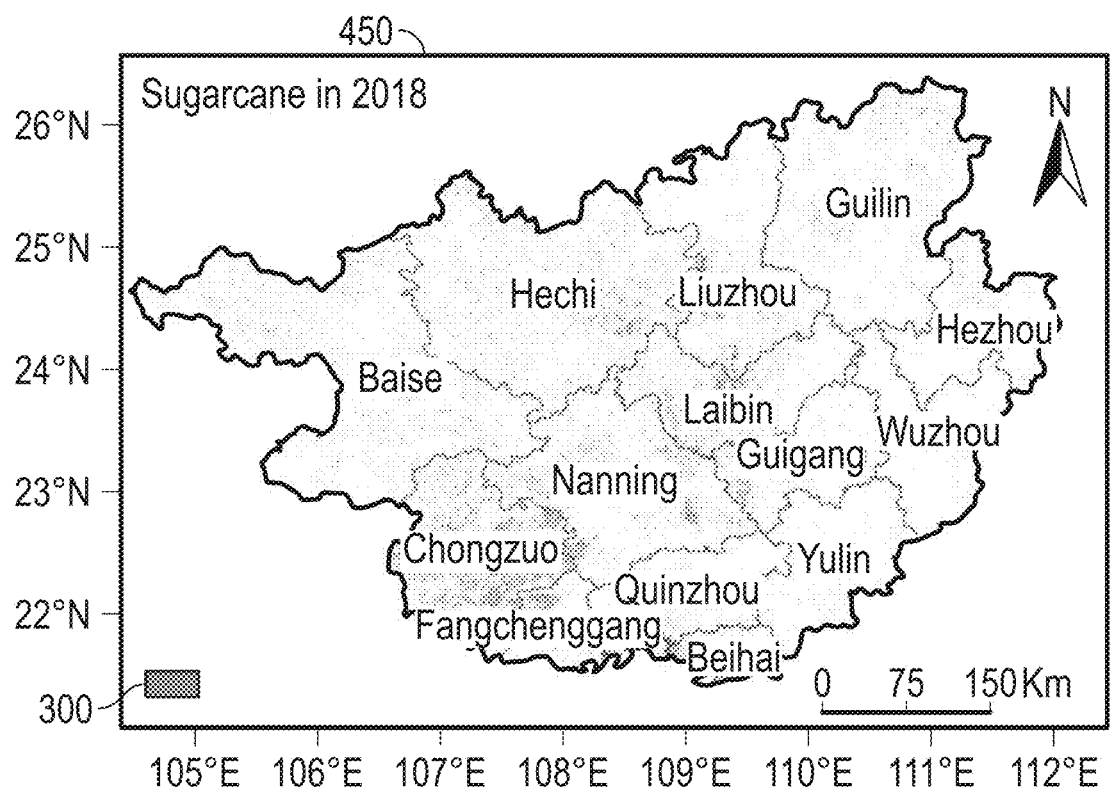
FIG. 6A
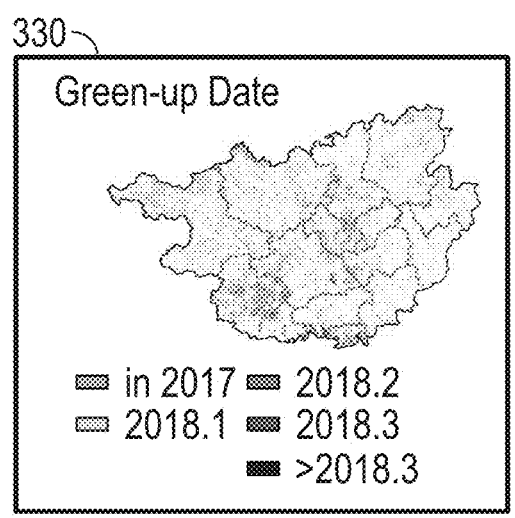 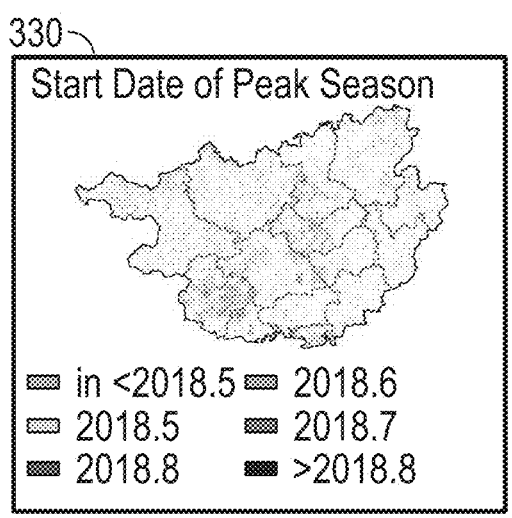
FIG. 6B          FIG. 6C

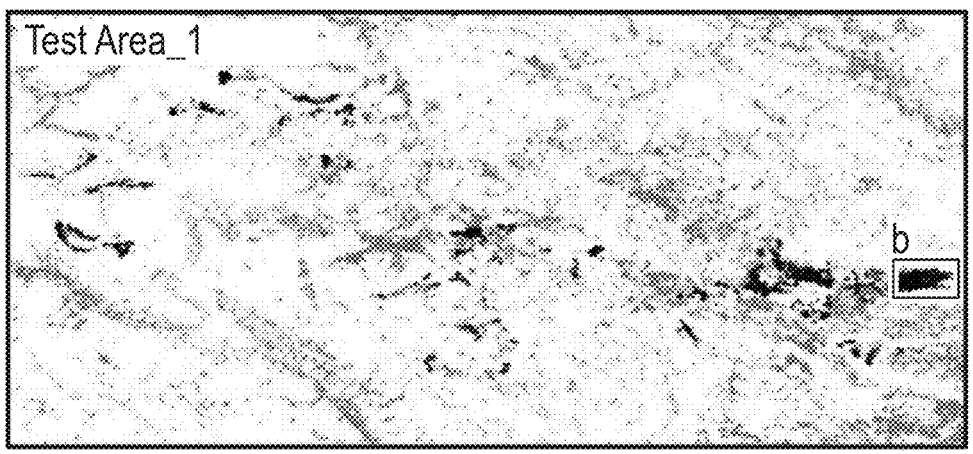
FIG. 8A
FIG. 8B
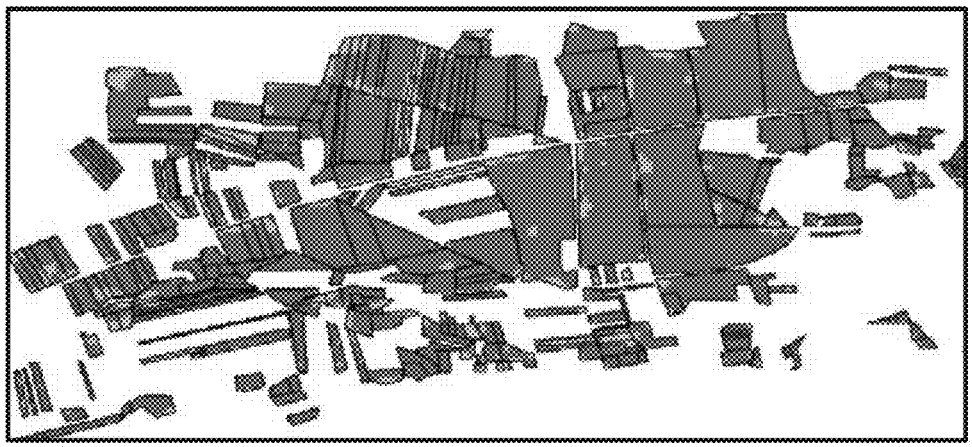
FIG. 8C
| | Polygons from UAV | | Recognized Pixels |
|---|---|---|---|
| 490 | Sugarcane Map in this Sudy | | Unrecognized Pixels |
| 485 | | | |

SYSTEM AND METHOD FOR MAPPING LAND COVER TYPES WITH LANDSAT, SENTINEL-1, AND SENTINEL-2 IMAGES

CROSS REFERENCE TO RELATED APPLICATIONS/INCORPORATION BY REFERENCE STATEMENT

The present patent application incorporates by reference the entire provisional patent application identified by U.S. Ser. No. 63/194,332, filed on May 28, 2021, and claims priority thereto under 35 U.S.C. § 119(e).

STATEMENT OF GOVERNMENT SUPPORT

This invention was made with government support under Grant No. 1R01AI101028 from the National Institute of Health, USA, and Grant No. NNX14AD78G from the National Aeronautics and Space Administration. The government has certain rights in the invention.

BACKGROUND

Sugarcane is a major crop for sugar and ethanol production. The area of land use by sugarcane has increased substantially in tropical and subtropical regions in recent decades.

Sugarcane (*Saccharum* spp.) is a perennial crop in the grass family grown in tropical and subtropical areas. Sugarcane accounts for about 70% of the global sugar production and is also used as a bioenergy feedstock for ethanol production. Sugarcane has been cultivated across the tropical and subtropical areas in the world, as it requires ample sunlight, high temperatures, and a large amount of water. The expansion of sugarcane areas in past decades has increased the demand for land, freshwater, and energy resources, which raised concerns on water scarcity and environmental changes.

To date, worldwide agricultural statistics data on sugarcane areas come from the field surveys, producer reports, questionnaires and interviews. The ground-based approach is time-consuming and labor-intensive and cannot provide timely information for all the sugarcane fields as it is based on sampling methods. A satellite remote sensing approach has been a viable means for mapping crop types across local, regional and global scales and complements the ground-based statistic data. In the last ten years, several studies have been used to map sugarcane fields in the world via satellite observations, for example, in Brazil. These studies have used the data from optical and synthetic aperture radars (SAR) at moderate spatial resolution (hundreds of meter), high spatial resolution (tens of meter) and very high spatial resolution (less than ten meters). The optical images utilized in the studies include the Landsat (30-m) satellite, the Indian Remote Sensing Satellite (IRS-P6, 5.8-m), the Advanced Spaceborne Thermal Emission and Reflection Radiometer (ASTER) data (15-m), the Satellite Pour l'Observation de la Terre (SPOT, 10-m) and the Moderate Resolution Imaging Spectroradiometer (MODIS, 250-m). The SAR images used in those studies include TerraSAR-X (1-m), Sentinel-1 (10-m), and ENVISAT ASAR (25-m). These studies differed from each other in terms of classification methods, which were grouped into three approaches: (1) visual interpretation and digitization of images, (2) spatial statistics of individual images and (3) temporal statistics of individual pixels.

Most of the studies were based on the spatial statistics approach and used single-date or multi-date images and calculated spatial statistics of spectral bands, vegetation indices and texture in these images, and applied unsupervised and/or supervised classification algorithms to generate sugarcane maps. As these classification methods depend on extensive training data collection, none of these studies reported annual sugarcane maps at the state and country scales.

The third approach is to use time series data of individual pixels; calculate the temporal statistics of spectral bands and vegetation indices of optical data, and backscatter coefficients of SAR data in the pixels; and apply decision trees and rule-based algorithms to generate annual maps of croplands. This approach is based on the phenological characteristics of specific vegetation or crop, which are recorded in the time series image data and can be identified and used for classification of individual pixels. A number of studies have demonstrated the potential of the phenology-based algorithms for crop mapping over multiple years across large spatial domain. This is because the phenology-based classification algorithms were developed by analyzing the crop life cycle to obtain temporal metrics of crops and generate classification rules. The foundation of the classification rules can be from crop calendars and crop growth knowledge which are roughly consistent over years. These phenology-based algorithms have been successfully applied for mapping the dominant crop types, for example, paddy rice (*Oryza sativa*), soybean (*Glycine max*), maize (*Zea mays*) and winter wheat (*Triticum aestivum*) fields.

As a perennial crop, sugarcane has a longer life cycle compared to the other main crops (e.g., rice, maize, soybean, and winter wheat). As such, there is a need to develop a new phenology-based system and method to identify and map sugarcane fields from diverse crop types across local, state and country scales.

BRIEF DESCRIPTION OF THE DRAWINGS

The patent or application file contains at least one drawing executed in color. Copies of this patent or patent application publication with drawing(s) will be provided by the Office upon request and payment of the necessary fee.

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 4A is a map of the exemplary region, i.e., Guangxi province, China, showing a distribution of water-related land covers, built-up and barren lands, evergreen vegetation, and potential croplands in Guangxi, China.

FIGS. 4B1, 4C1, 4D1, and 4E1 show randomly selected zoomed-in areas from FIG. 4A.

FIG. 4B2 shows an aerial image of the zoomed-in area depicted in FIG. 4B1.

FIG. 4C2 shows an aerial image of the zoomed-in area depicted in FIG. 4C1.

FIG. 4D2 shows an aerial image of the zoomed-in area depicted in FIG. 4D1.

FIG. 4E2 shows an aerial image of the zoomed-in area depicted in FIG. 4E1.

FIG. 6A depicts a sugarcane distribution map in 2018 for Guangxi, China.

FIGS. 6B-6F illustrate exemplary phenology metric maps for sugarcane fields in Guangxi, China.

FIGS. 8A and 8D depict a spatial distribution of a small unmanned aerial system (sUAS) data at two pilot regions including 2249 and 139 polygons.

FIG. 8B is a zoom-in view of the sUAS polygons in the first pilot region labeled as b in FIG. 8A.

FIGS. 8C and 8E depict recognized and unrecognized pixels of a resulting sugarcane map in 2018 within each sUAS polygon for two pilot regions.

DETAILED DESCRIPTION

Figure 1:
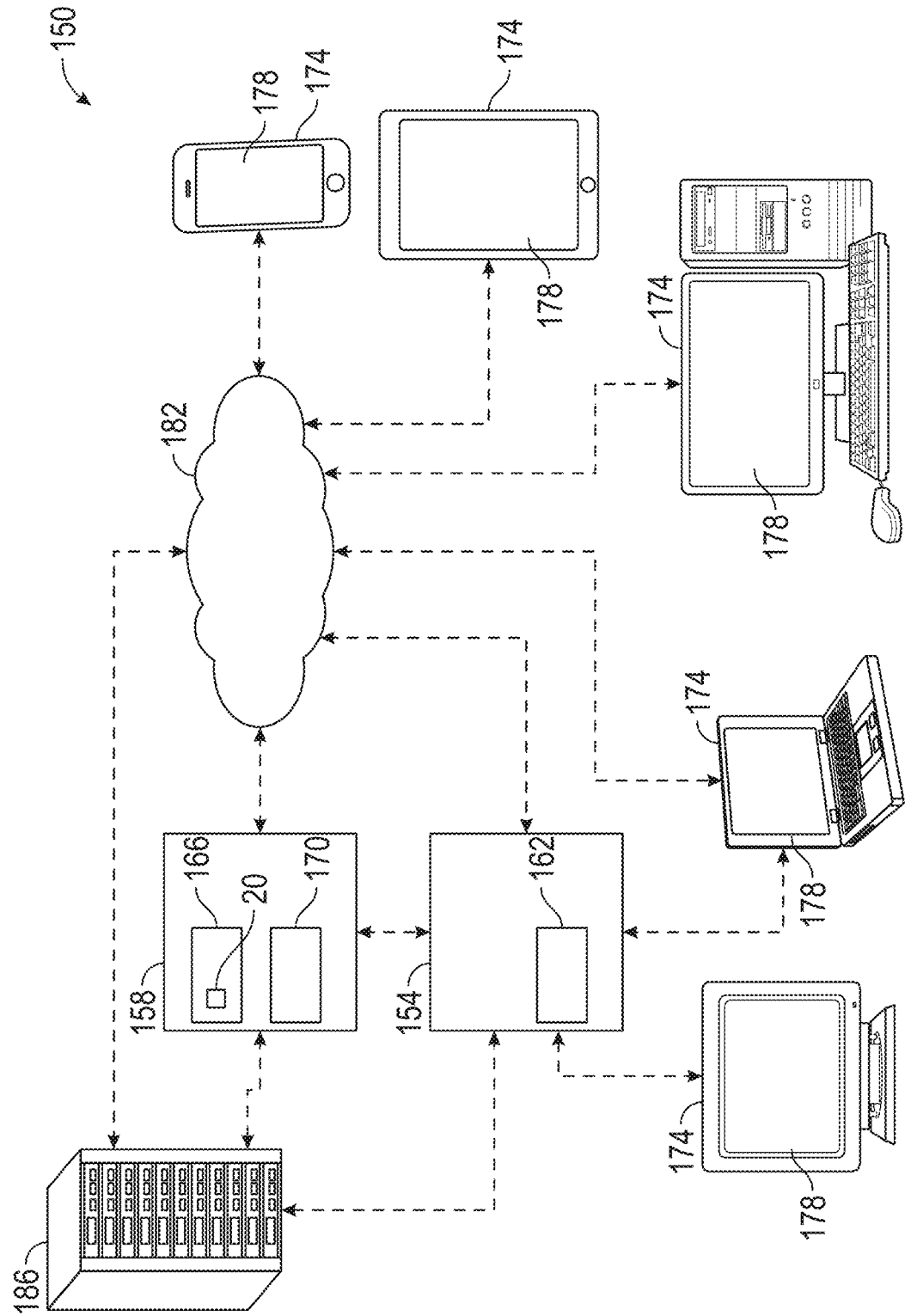
FIG. 1 illustrates a schematic diagram of an exemplary computer system in accordance with the present disclosure.

The present disclosure generally relates to a system and method that identify crop types across local, state, and/or country scales. More particularly the disclosure relates to a system and method utilizing a phenology-based algorithm which identifies and maps particular types of crop fields from diverse crop types across local, state and/or country scales. As disclosed herein by way of example, but in no way limiting, the phenology-based system and method shall reference the identification and mapping of sugarcane cropland in Guangxi, China.

Before describing various embodiments of the embodiments of the present disclosure in more detail by way of exemplary description, examples, and results, it is to be understood that the embodiments of the present disclosure are not limited in application to the details of methods and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description. No element, act, or instruction used in the present application should be construed as critical or essential unless explicitly described as such. Further, the phrase "based on" is intended to mean "based, at least in part, on" unless explicitly stated otherwise.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the compositions and methods of the embodiments of the present disclosure have been described in terms of particular embodiments, it will be apparent to those of skill in the art that variations may be applied to the compositions and/or methods and in the steps or in the sequence of steps of the method described herein without departing from the spirit and scope of the inventive concepts. All such similar substitutes and modifications apparent to those of skilled in the art are deemed to be within the spirit and scope of the inventive concepts as defined herein.

As utilized in accordance with the methods and compositions of the embodiments of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" or "approximately" is used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±1%, or ±5%, or ±10%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 75% of the time, at least 80% of the time, at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions, also referred to as executable code, that when executed by one or more components cause the component to perform a specified function. It should be understood that the algorithms described herein may be stored on one or more non-transitory computer readable medium.

Exemplary non-transitory computer readable mediums may include random access memory, read only memory, flash memory, and/or the like. Such non-transitory computer readable mediums may be electrically based, optically based, magnetically based, and/or the like. Non-transitory computer readable medium may be referred to herein as non-transitory memory.

As discussed above, there is a need to develop a new phenology-based system and method to identify and map at least one particular type of cropland from diverse cropland types across local, state and/or country scales. The present disclosure by way of example, but in no way limiting, addresses these deficiencies with a methodology, which utilizes satellite imagery for generating a map of sugarcane cropland.

Referring now to the drawings, FIG. 1 illustrates a schematic diagram of an exemplary computer system in accordance with the present disclosure.

As shown in FIG. 1, shown therein is the computer system 150 designed to use phenology metrics to identify at least one particular type of cropland. The computer system 150 may comprise one or more processor 154 and one or more non-transitory computer-readable medium 158. The computer system 150 may further comprise one or more communication component 162, such as wired or wireless ethernet adapter. The one or more non-transitory computer-readable medium 158 may store one or more database 166 and program logic 170. The one or more database 166 may comprise the images 20 and/or other data. In some non-limiting embodiments, the computer system 150 may have one or more non-transitory computer-readable medium 158 storing a set of computer executable instructions for running on the one or more processor 154 that when executed cause the one or more processor 154 to use phenology metrics to identify at least one particular type of cropland as detailed herein. In some non-limiting embodiments, one or more images 20 may be provided from one or more outside sources and/or stored remotely.

The computer system 150 may bi-directionally communicate with a plurality of user devices 174, which may or may not have one or more screen 178, and/or may communicate via a network 182. The one or more processor 154 may or may not necessarily be located in a single physical location.

In some non-limiting embodiments, the non-transitory computer-readable medium 158 stores the program logic 170, for example, a set of instructions capable of being executed by the one or more processor 154, that when executed by the one or more processor 154 causes the one or more processor 154 to carry out the method 100 (see FIGS. 2A and 2B) designed to use image pixel analysis to generate at least one land cover mask 200, followed by the use of phenology metrics to identify at least one particular type of cropland 300 (see FIG. 3A) and/or other functions.

In some non-limiting embodiments, the network 182 is the internet and the user devices 174 interface with the computer system 150 via the communication component 162 and a series of web pages. It should be noted, however, that the network 182 may be almost any type of network 182 and may be implemented as the World Wide Web (or Internet), a local area network (LAN), a wide area network (WAN), a metropolitan network, a wireless network, a cellular network, a Global System for Mobile communications (GSM) network, a code division multiple access (CDMA) network, a 3G network, a 4G network, a 5G network, a satellite network, a radio network, an optical network, a cable network, an Ethernet network, combinations thereof, and/or the like. In some non-limiting embodiments, the computer system 150 comprises a server system 186 having multiple servers in a configuration suitable to provide a commercial computer-based business system such as a commercial web-site and/or data center.

Figure 2A:
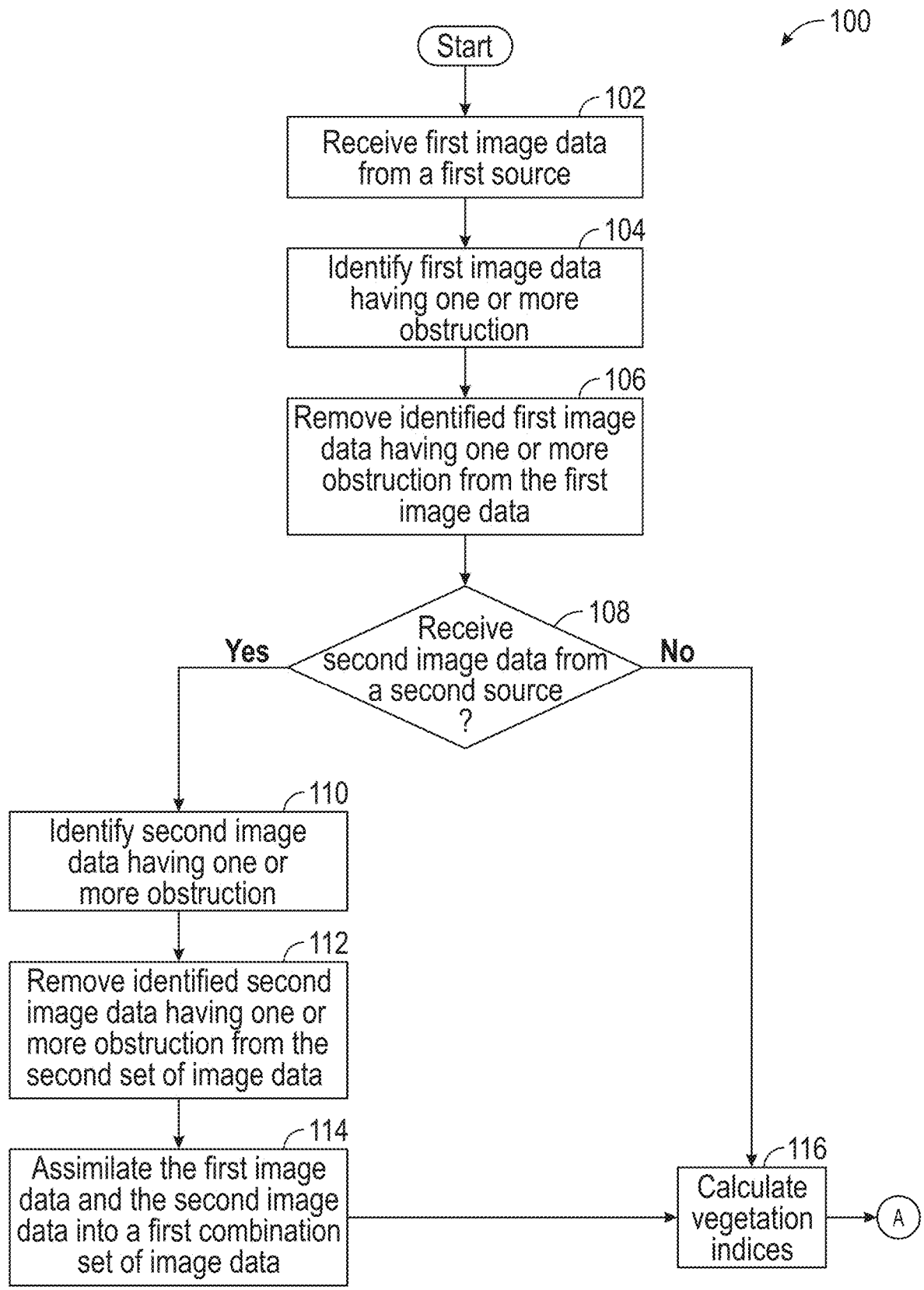
FIGS. 2A-2B show an exemplary method of mapping at least one particular type of cropland in accordance with aspects of the present disclosure.
Figure 2B:
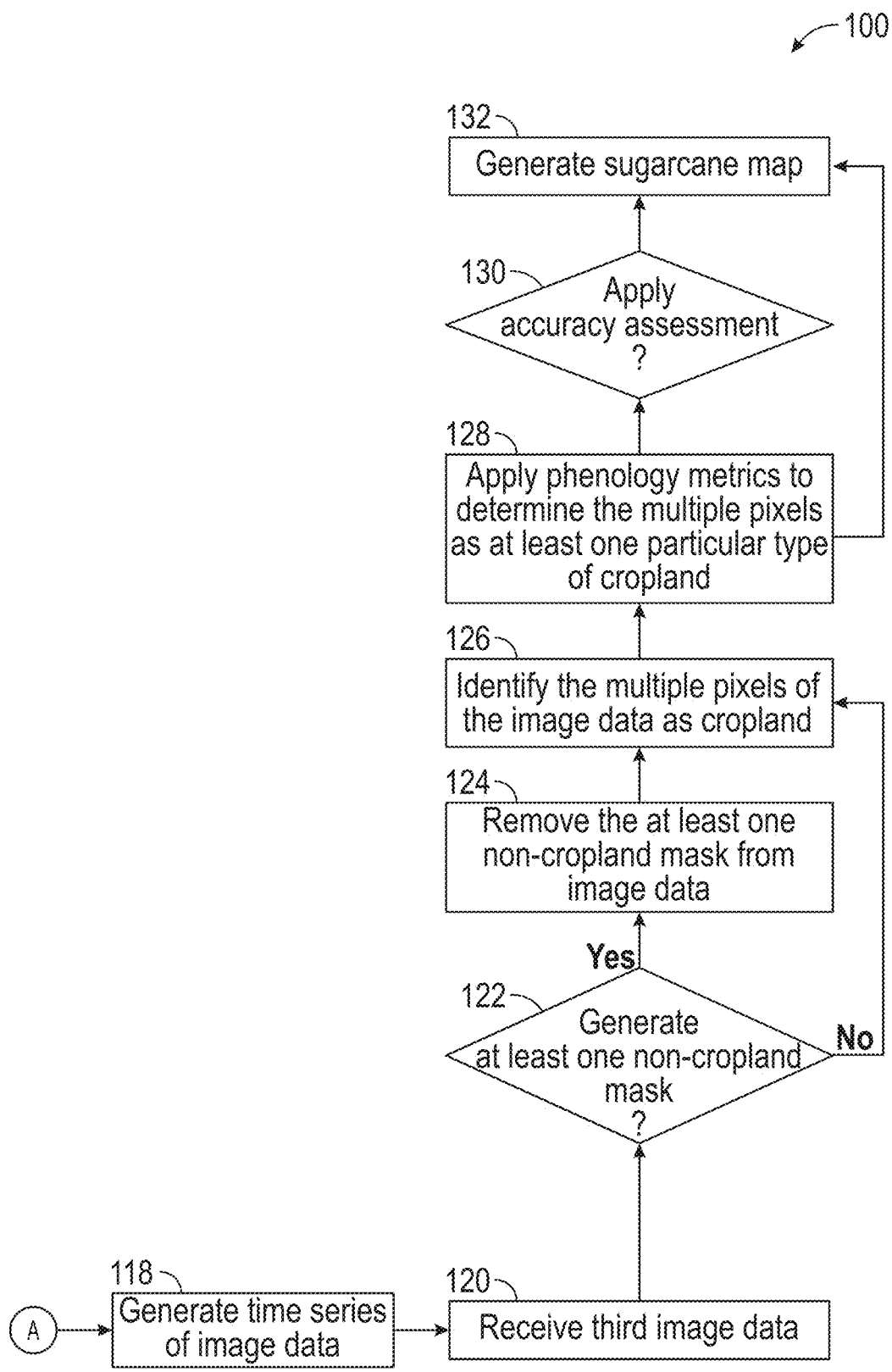

FIGS. 2A and 2B illustrate an exemplary method 100 of mapping at least one particular type of cropland 300 (shown in FIG. 3A) in accordance with aspects of the present disclosure. Initially, the processor 154 receives first image data from a first source, as identified by step 102. The first image data is of a geographic region 210 (see FIG. 3A) and has pixels. The pixels within the first image data are geo-referenced such that each pixel has a known real-world location within the geographic region 210 associated with the pixel. The first image data includes multiple overlapping images 20, resulting in multiple pixels for real-world locations within the geographic region 210. In some non-limiting embodiments, the first image data can be satellite images conforming to the requirements of Landsat data. Landsat data may include all available standard Level-1 Landsat-7 Enhanced Thematic Mapper (ETM+) and Landsat-8 Operational Land Imager (OLI) from the United States Geological Survey (USS).

To obtain images 20 with an unobstructed view of a surface of the geographic region 210, the first image data can be analyzed in a step 104 to remove any images 20 within the first image data that include an obstruction obscuring the surface of the geographic region 210. Exemplary obstructions include cloud(s), haze, fog, dust or the like. Images 20 that are identified as having at least one obstruction are then removed from the first image data, as shown in step 106 of FIG. 2A.

In some non-limiting implementations, the first image data may not include all of the different types of pixel data required to calculate a plurality of vegetation indices discussed below. In these non-limiting implementations, the method 100 branches to a step 108 where the method 100 determines whether additional image data should be received from another data source. If so, the method 100 receives second image data from a second source. In some non-limiting embodiments, the second image data may be geo-referenced image data from a source different from the first image data source, such as Sentinel data. Sentinel data may include all available Sentinel-2 Multi Spectral Instrument Data (MSI) including all available Level-1C Sentinel-2A and Sentinel-2B images from European Space Agency (ESA). This step 108 can be repeated to obtain image data from additional data sources. When the second image data is received, the second image data may be analyzed to determine the presence of one or more obstruction as identified by a step 110 in FIG. 2A. When image(s) 20 having one or more obstruction is located, such image(s) 20 may be removed from the image data in a step 110 so that the second image data only includes images 20 having an unobstructed depiction of the surface.

The first image data from the first source may be assimilated with the second image data from the second source into a first combination set of image data, as identified by a step 114 in FIG. 2A. Upon the assimilation of the first image data from the first source and the second image data from the second source into the first combination set of image data, the plurality of vegetation indices may be calculated for the first combination set of image data as illustrated in step 116. In another non-limiting implementation, the first image data may solely include the pixel data sufficient to calculate the vegetation index discussed below, as such, the method will not branch to step 108 from step 106. Instead, the method will branch from step 106 to step 116 as seen in FIG. 2A. After the calculation of the vegetation indices, a first time series of image data is generated as discussed below and as identified in a step 118 of FIG. 2B.

Figure 3A:
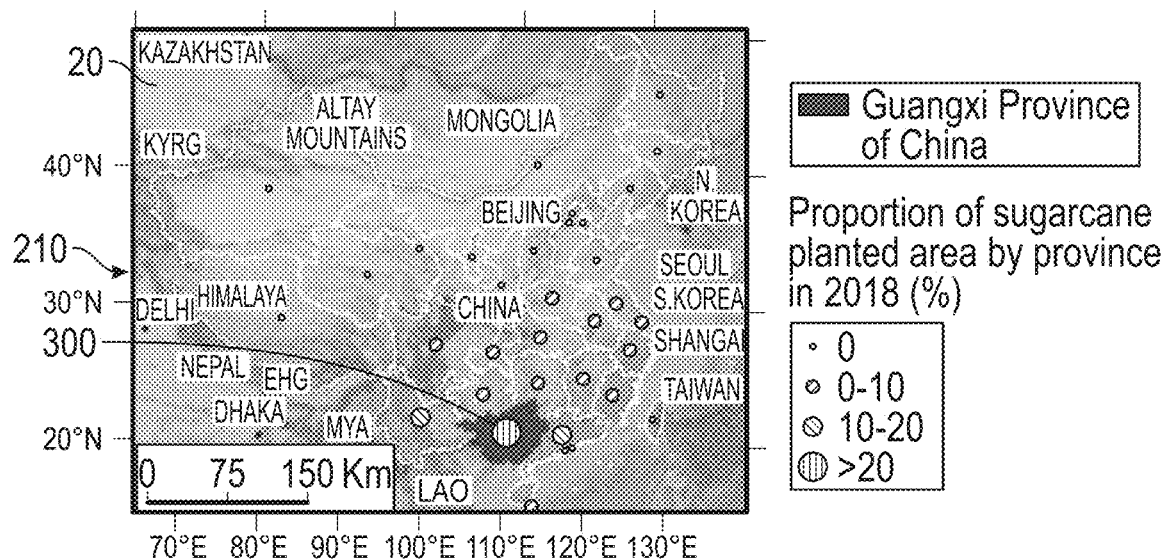
FIG. 3A is a map of China, and also showing a proportion of sugarcane planted area by province.

Referring to FIGS. 2B and 3A, after generating the first time series, in some implementations third image data is received from a third source as seen in a step 120 in FIG. 2B. The third image data is of the same geographic region 210 discussed above and has pixels. The pixels within the third image data are geo-referenced such that each pixel has a known real-world location within the geographic region 210 associated with the pixel. The third image data may include multiple overlapping images, resulting in multiple pixels for real-world locations within the geographic region. In some non-limiting embodiments, the third image data can be satellite images conforming to the requirements of SAR data. SAR data may include all available images from Sentinel-1A and Sentinel-1B from the European Space Agency (ESA).

Referring to FIGS. 2B, 3 and 4A, n some implementations, upon receiving the third image data at least one land cover mask 200 will be generated as discussed below and as seen in a step 122 in FIG. 2B. The at least one land cover mask 200 may include water-related land cover type 202, non-vegetated land cover type 204, and evergreen land cover type 206. Upon the generation of the at least one land cover mask 200, the method 100 branches to a step 124 where the method 100 removes the at least one land cover mask 200 from the image data. Once the at least one land cover mask 200 is removed in the step 124 of FIG. 2B, the method 100 identifies the remaining multiple pixels for the real-world locations as cropland 208 in a step 126 as seen in FIG. 2B. In order for the method 100 to identify the cropland 208 as at least one particular type of cropland 300 within the second real-world locations, phenology metrics are applied in a step 128 in FIG. 2B. In some non-limiting embodiments, the phenology metrics can be a set of statistics extracted from information on the surface of the geographic region for a specific time-series within a specific time period Referring to FIGS. 6A-6F and FIGS. 71-7C, the phenology metrics of the at least one particular type of cropland 300 may include crop growth cycles per year, green-up speed (GUS), green-up date (GUD, or start of season) 330, senescent date (SD, or end of the season) 340, growing season length (GSL) 350, and start date of peak season (SDPS) 360.

Referring to FIGS. 2B and 4A-4E2, n some non-limiting implementations, upon receiving the third image data in step 120, the image data may have multiple pixels that consist only of areas determined to be cropland 208 in the manner discussed below. As such, the method 100 branches to a step 126 in which the multiple pixels of the image data may be identified as cropland 208. Phenology metrics are then applied to the multiple pixels of the image data identified as cropland 208 to determine the multiple pixels of the image data as at least one particular type of cropland 300 as seen in step 128. In some non-limiting implementations, the method 100 may apply an accuracy assessment of the identification of the at least one particular type of cropland 300 as seen in a step 130. Referring to FIGS. 2B and 6A, after the accuracy assessment is applied, a map 450 of the at least one particular type of cropland 300 is generated from the multiple pixels of the image data identified as at least one particular type of cropland 300. In some non-limiting embodiments, as seen in FIG. 2B, the method 100 may branch to a step 132 from the step 128 to generate the map 450 of the at least one particular type of cropland 300 without the accuracy assessment. The map 450 comprising image data having multiple pixels of the image data of the second real-world locations.

Figure 3B:
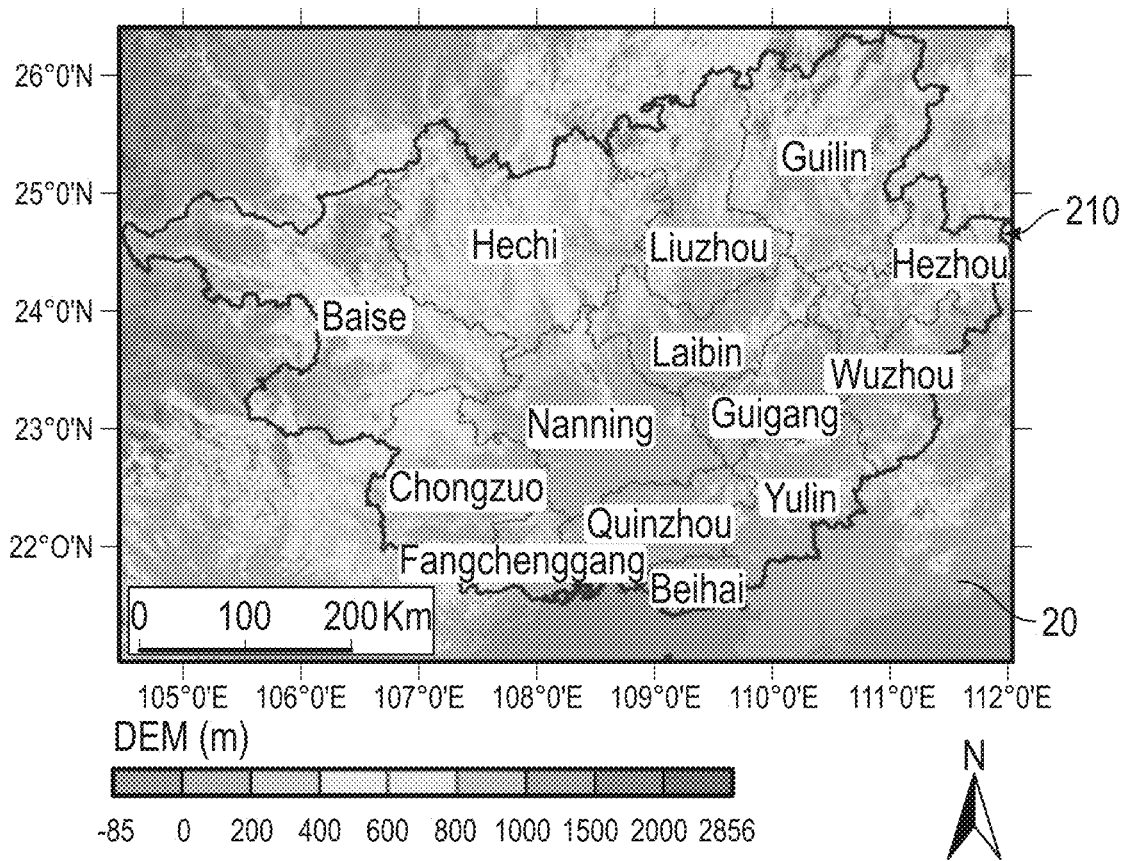
FIG. 3B is a topography map of an exemplary region, i.e., Guangxi province, China in accordance with aspects of the present disclosure.

FIG. 3A discloses the image 20 (i.e., satellite image) depicting the location of an exemplary geographic region 210, which by way of example may be the Guangxi Region in accordance with aspects of the present disclosure. FIG. 3B is the image 20 (i.e., satellite image) depicting the topography of the exemplary geographic region 210, e.g., the Guangxi Region, in accordance with aspects of the present disclosure. Referring to FIGS. 1, 2 and 3A, the processor 154 receives first image data from a first source, as identified by step 102. The first image data is of a geographic region 210 and has pixels. The pixels within the first image data are geo-referenced such that each pixel has a known real-world location within the geographic region 210 associated with the pixel. The first image data includes multiple overlapping images, resulting in multiple pixels for real-world locations within the geographic region 210. The multiple pixels for the real-world locations collectively have pixel information selected from a group consisting of colors within a visible spectrum, infra-red, and shortwave infrared. In some non-limiting embodiments, the pixel information of the multiple pixels for the real-world locations is selected from a group consisting of one or more red pixel, blue pixel, or green pixel within the visible spectrum. In some non-limiting embodiments, the pixel information of the multiple pixels for the real-world locations is selected from a group consisting of cyan, magenta, yellow, and black. The first image data can be satellite images conforming to the requirements of Landsat data. Landsat data may include all available standard Level-1 Landsat-7 Enhanced Thematic Mapper (ETM+) and Landsat-8 Operational Land Imager (OLI) from the United States Geological Survey (USS).

In some non-limiting embodiments, the first image data will not include all of the different types of pixel data required to calculate the plurality of vegetation indices discussed below. For example, the one or more processors 154 may determine additional image data may be obtained from another data source. In some non-limiting embodiments, second image data of the geographic region 210 is received by the one or more processors 154 from the second source. The second image data has pixels that are geo-referenced such that each pixel has a known real-world location within the geographic region 210 associated with the pixel. The second image data includes multiple overlapping images, resulting in multiple pixels for real-world locations within the geographic region 210. The multiple pixels for the real-world locations collectively have pixel information selected from a group consisting of colors within a visible spectrum, infra-red, and shortwave infrared. In some non-limiting embodiments, the pixel information of the multiple pixels for the real-world locations is selected from a group consisting of one or more red pixel, blue pixel, or green pixel within the visible spectrum. In some non-limiting embodiments, the pixel information of the multiple pixels for the real-world locations is selected from a group consisting of cyan, magenta, yellow, and black. The second image data may be geo-referenced image data from a source different from the first image data source, such as Sentinel data. Sentinel data may include all available Sentinel-2 Multi Spectral Instrument Data (MSI) included all available Level-1C Sentinel-2A and Sentinel-2B images from European Space Agency (ESA).

By way of example and in no way limiting, in some non-limiting embodiments, the first image data may be top of atmosphere (TOA) reflectance data from a Landsat-7/8 first source and the second image data received may be top of atmosphere reflectance data from a Sentinel-2 second source ("LC/S2 data"). The second image data may be surface reflectance (SR) data (Level-2A) from the Sentinel-2 second source. TOA data may have significant limitations given the sensitivity to changes in the composition of the atmosphere through time; however, TOA data exploits the spectral differences among one or more cropland 208 with the first image data and/or the second image data, which may be used for cropland 208 classification. The first image data from the Landsat-7/8 first source may include all available standard Level-1 Landsat-7 Enhanced Thematic Mapper (ETM+) and Landsat-8 Operational Land Imager (OLI) from the United States Geological Survey (USGS), for example. In some non-limiting embodiments, the first image data from the Landsat-7/8 first source may have 30-m spatial resolution and 16-day temporal resolution. The second image data from the Sentinel-2 second source may be Sentinel-2 Multi Spectral Instrument data ("MSI data"). The MSI data may include all available Level-1C Sentinel-2A and Sentinel-2B images from the European Space Agency (ESA). Sentinel-2A/B data together may have 10-m spatial resolution and 5-day temporal resolution.

After receiving the image data, the plurality of vegetation indices, e.g., normalized difference vegetation index (NDVI), enhanced vegetation index (EVI), land surface water index (LSWI) may be determined. The vegetation indices may be calculated from the surface reflectance data in blue, red, near infrared, and shortwave infrared spectral bands. In some non-limiting embodiments, the plurality of vegetation indices may be determined with the first image data from the first source. The processing of the first image data from the first source to determine the plurality of vegetation indices may include the processor 154 receiving the first image data from the first source, the processor 154 identifying first image data having one or more obstruction, the processor 154 removing the first image data having one or more obstruction from the first image data, and the processor 154 determining the plurality of vegetation indices with combinations of the multiple pixels from the first image data for particular real-world locations within the geographic region. In some non-limiting embodiments, determining the plurality of vegetation indices may further comprise the processor 154 receiving second image data from the second source and processing a first combination set of image data. The first combination set of image data comprising the first image data from the first source and the second image data from the second source. The processing of the first combination set of image data includes, in no particular order, the processor 154 identifying the first image data having one or more obstruction, the processor 154 removing the first image data having one or more obstruction from the first image data, the processor 154 receiving the second mage data from the second source, the processor 154 identifying the second mage data having one or more obstruction, the processor 154 removing the second image data having one or more obstruction from the second image data, the processor 154 combining the first image data and the second image data into the first combination set of image data, and the processor 154 calculating the plurality of vegetation indices with combinations of the multiple pixels from the first combination set of image data for particular real-world locations within the geographic region.

By way of example but in no way limiting, the plurality of vegetation indices may be determined using the LC/S2 data. The processor 154 may receive the first image data from the Landsat-7/8 first source and the second image data from the Sentinel-2 second source and process the image data as the first combination set of image data. The plurality of vegetation indices may include a Normalized Difference Vegetation Index (NDVI, Eq. 1 as seen below) 470, an Enhanced Vegetation Index (EVI, Eq. 2 as seen below), a Land Surface Water Index (LSWI, Eq. 3 as seen below), and a Modified Normalized Difference Water Index (mNDWI, Eq. 4 as seen below). The combination of the first image data and the second image data may require the band reflectance values to be combined and harmonized in order to combine the first data set with the second data set. The combining of the band reflectance values of the first image data and the second image data may be harmonized by the approach of ordinary least squares (OLS) regression. In some non-limiting embodiments, the pixel resolution and spectral bands of Landsat-7 ETM+ and Sentinel-2 MSI are harmonized to match the observations of Landsat-8 OLI, wherein the Landsat-8 OLI is used as a reference.

In some non-limiting embodiments, a time series of the plurality of vegetation indices may be generated for the first combination set of image data. At least one of the vegetation indices may be sensitive to vegetation greenness of the cropland 208 and water status and therefore may be used to capture the physical differences of land cover types and characterize the growth curves of individual types of cropland. In other words, one of the vegetation indices is an indicator of vegetation greenness and can be used to track change in vegetation greenness. Plant leaves and vegetation can be green (alive) or yellow (dead). The NDVI and the EVI may be related to leaf area index and chlorophyll in the canopy and used to indicate the vegetation greenness of the cropland 208. The LSWI may be sensitive to the moisture of land surface from the vegetation of the cropland 208 and the soil. In other words, the LSWI is an indicator or measure for moisture or water content in the land surface and can be used to track change in water content or moisture of land surface (including vegetation and soils). The mNDWI may delineate a water body on the surface by suppressing background information from vegetation of the cropland 208 and the soil. By way of example, but in no way limiting, the plurality of vegetation indices are calculated from the blue, green, red, near infrared (NIR) and shortwave infrared (SWIR) spectral bands of the TOA data from the Lansat-7/8 first source and the Sentinel-2 second source using Equations 1-4 below.

$$NDVI = \frac{\rho_{NIR} - \rho_{Red}}{\rho_{NIR} + \rho_{Red}} \quad \text{(Eq. 1)}$$

$$EVI = 2.5 \times \frac{\rho_{NIR} - \rho_{Red}}{\rho_{NIR} + 6 \times \rho_{Red} - 7.5 \times \rho_{Blue} + 1} \quad \text{(Eq. 2)}$$

$$LSWI = \frac{\rho_{NIR} - \rho_{SWIR}}{\rho_{NIR} + \rho_{SWIR}} \quad \text{(Eq. 3)}$$

$$mNDWI = \frac{\rho_{Green} - \rho_{SWIR}}{\rho_{Green} + \rho_{SWIR}} \quad \text{(Eq. 4)}$$

In some non-limiting embodiments, the time series may also be generated via image compositing. By way of example, but in no way limiting, a 10-day interval time series is constructed using the plurality of vegetation indices from the LC/S2 data. In some non-limiting embodiments, the LC/S2 data may not have one or more obstruction within a 10-day period, as such, the mean value of the LC/S2 data may be used to represent the observation value of the 10-day period. In some non-limiting embodiments, when the entirety of the LC/S2 data has one or more obstruction in a 10-day period, the data gap is filled by the linear interpolation method. The linear interpolation method uses the adjacent good-quality observations in the time series. In some non-limiting embodiments, the times series constructed using the NDVI data may be harmonized by a phenology analysis via the Savitzky-Golay filter to eliminate small fluctuations using a moving window of size 9 and a filter order of 2. As LSWI is sensitive to vegetation water and soil moisture that are affected by rainfall and snow, a time series constructed using the LSWI data may not be smoothed for phenology analysis.

After the generation of the time series via the plurality of vegetation indices of the LC/S2 data, third image data may be received from a third source to construct a time series of VH data. In some non-limiting embodiments, the Google Earth Engine platform ("GEE") may be used to process all 10-m third image data with a VH polarization band into a time series constructed of VH data. The time series constructed of VH data may have a time interval based upon a capture repeat cycle and constructed using the linear interpolation method. For example, Sentinel-1 has two satellites in orbit, named Sentinel-1A and Sentinel-1B). Each Sentinel-1 satellite is in a near-polar, sun-synchronous orbit, with a 12-day repeat (or revisit) cycle. The 2-satellite constellation has 6-day repeat (revisit) cycle at the equator. Sentinel-2 also has two satellites in orbit named as Sentinel-2A and Sentinel-2B. Each satellite has 10-day repeat cycle at the equator. The 2 satellite constellation has a 5-day repeat cycle at the equator. The time interval of the time series constructed of VH data from Sentinel-1 may be 12 days. The time series constructed of VH data may be smoothed (i.e., statistical interpolation of time series data) using a moving average method with a moving window. The moving window may be of size 3. The size of the moving window can vary depending upon the third image data. By way of example, for Sentinel-1 data (SAR data), 3 points in the time series is normally sufficient. For Sentinel-2 data (optical data), the analysis may begin with a 3-point window. If the results from using the 3-point window is are determined to be insufficient via the processor 154, then a 5-point window may be used. By way of example, but in no way limiting, the third image data may be SAR images from the European Space Agency (ESA) Sentinel-1A and Sentinel-1B.

After the generation of the time series, at least one land cover mask 200 may be generated as seen in FIGS. 4A-E2. FIG. 4A discloses a plurality of land cover masks 200 across Guangxi Region in 2018. The plurality of land cover masks 200 may include the water-related land cover type 202, the non-vegetated land cover type 204, and the evergreen vegetation land cover type 206. As described in further detail below, the cropland 208 disclosed in FIGS. 4A-4E2 may be determined by the removal of the multiple pixels identified as at least one land cover mask 200 from the image data.

In some non-limiting embodiments, the at least one land cover mask 200 may be generated by the processor 154 via the plurality of vegetation indices of the first image data. In some non-limiting embodiments, the at least one land cover mask 200 may be generated by the processor 154 via the plurality of vegetation indices of the first image data and the second image data. In some non-limiting embodiments, the at least one land cover mask 200 may be generated by the processor 154 via plurality of vegetation indices of the first image data, the second image data, and the third image data. The at least one land cover mask 200 may include multiple pixels of first real-world locations within the geographic region 210 identified as the water-related land cover type 202, the non-vegetated land cover type 204, and the evergreen land cover type 206. Water-related land cover type 202 may be defined as a land cover mask associated with one or more bodies water including, but not limited to, one or more surface water body, natural wetland, paddy rice field, flooded land, combinations thereof, and the like. The non-vegetated land cover type 204 may be defined as a land cover mask associated with land devoid of plant life or plant cover including, but not limited to, built-up surfaces, barren land, combinations thereof, and the like. The evergreen land cover type 206 may be defined as a land cover mask associated with land having plants or plant cover including, but not limited to, forests, tree plantations, orchards, shrubs, combinations thereof, and the like. The multiple pixels of second real-world locations within the geographic region 210 that are not classified as at least one land cover mask 200 are identified by the processor 154 as cropland 208. Cropland 208 may be defined as areas used for the production of crops for harvest including cultivated land and non-cultivated land. Cropland may include, but is not limited to, sugarcane, maize, combinations thereof, or the like.

Specifically, but in no way limiting, the seasonal dynamics of NDVI and LSWI data from the LC/S2 data and VH backscatter data from the Sentinel-1 third source may be used to generate at least one land cover mask 200, i.e., the water-related land cover type 202, the non-vegetated land cover type 204, and the evergreen land cover type 206, as well as identify at least one particular type of cropland 300 in the Guangxi Region.

As seen in FIGS. 4A, B1, C1, D1, and E1, the at least one land cover mask 200 may be the water-related land cover type 202. One or more water-related land cover type 202 may be identified by a water-related land cover type 202 algorithm that uses time series constructed of NDVI, EVI, and mNDWI. One or more surface water body water-related land cover type may be expressed as mNDWI>NDVI or mNDWI>EVI and NDVI<0.1 or EVI<0.1. One or more pixels identified as one or more surface water body water-related land cover type 202 may have >=75% observations identified as one or more surface water body water-related land cover type 202 in a year. Seasonal one or more surface water body water-related land cover type 202 may have a plurality of pixels having >=5% observations identified as the one or more surface water body water-related land cover type 202 in a year. In addition, one or more paddy rice field water-related land cover type may have a seasonal flooding signal, i.e. the mixed feature of water and plants, during the flooding and transplanting period). This unique plant/water feature of the one or more paddy rice field water-related land cover type 202 may last several weeks. A challenge for paddy rice mapping using optical satellites is to have sufficient number of good-quality observations to capture this flooding signal during the short time window. In some non-limiting embodiments, the one or more paddy rice field water-related land cover type 202 may be identified via VH backscatter data from the Sentinel-1 third source. The VH backscatter data from the Sentinel-1 third source may be very low, for example VH<−20, for one or more pixel. Therefore, the at least one land cover mask 200 identifying first real-world locations within the geographic region 210 having the water-related land cover type 202 may be used to reduce the uncertainty from optical satellite observations using the algorithm of NDVI>0.3, LSWI>0 and VH<−20 during the rush-harvesting and rush-transplanting period.

As seen in FIGS. 4A, B1, C1, D1, and E1, the at least one land cover mask 200 may be the non-vegetated land cover type 204. The non-vegetated land cover type 204 may have higher reflectance in SWIR band than in NIR band, which results in a negative LSWI (LSWI<0). A non-vegetated land cover type 204 algorithm may use a time series constructed of LSWI data to identify one or more non-vegetated land cover type 204. The one or more non-vegetated land cover type 204 may be observed having more than 90% with LSWI<0 in a year. The one or more non-vegetated land cover type 204 may also show low NDVI and LSWI for one or more non-vegetated land cover type via spectral data analysis. The processor 154 may generate the at least one land cover mask 200 identified as the non-vegetated land cover type 204. By way of example, but in no way limiting, the Guangxi Region having complex and fragmented landscapes, the threshold of LSWI may be modified from 0 to 0.2 (LSWI<0.2) to identify the mixed pixels identified as non-vegetated land cover type 204 and evergreen land cover type 206. The non-vegetated land cover type 204 may include built-up surfaces, barren lands, and the like.

As seen in FIGS. 4A, B1, C1, D1, and E1, the at least one land cover mask 200 may be determined via the plurality of vegetation indices as the evergreen land cover type 206. By way of example, the processor 154 may consider (1) the frequency of LSWI values larger than zero in a year and (2) minimum EVI value. When a pixel has a frequency of 90% or higher with LSWI>0 and minimum EVI>0.2 in a year, the pixel is classified as the evergreen land cover type. A decision tree classification algorithm that uses time series constructed of LSWI and EVI data may be used to identify the evergreen land cover type 206. For example, in some non-limiting embodiments, the evergreen land cover type 206 has more than 90% observations with LSWI>0 in a year and minimum EVI>0.2. The decision tree algorithm may be applied with MODIS (Moderate Resolution Imaging Spectroradiometer) and Landsat data for evergreen land cover type 206 identification in China, USA, and the pan-tropical zones).

After the generating of the at least one land cover mask 200 identifying first real-world locations within a geographic region 210 having one or more water-related land cover type 202, one or more non-vegetated land cover type 204, and/or one or more evergreen land cover type 206, second real-world locations within the geographic region 210 that are not classified as at least one land cover mask 200 are identified as cropland 208 via one or more processor 154. This can be accomplished by creating a pixel map for the geographic region 210. The pixel map has a plurality of pixels, with each pixel corresponding to real world locations within the geographic region 210. Multiple pixels indicative of the second real-world locations can identified as cropland 208 within the pixel map. Time-series image data of the multiple pixels identified as cropland 208 is analyzed with phenology metrics to identify at least one particular type of cropland 300 within the multiple pixels identified as cropland 208. In some non-limiting embodiments, the processor 154 may analyze the time series of the first combination data set with phenology metrics to identify at least one particular type of cropland 300 within the multiple pixels, as in FIG. 5. In some non-limiting embodiments, the processor 154 may analyze a time series of a second combination data set with phenology metrics to identify the multiple pixels as at least one particular type of cropland 300. The second combination data set may include the first image data, the second image data, and the third image data. The at least one particular type of cropland 300 may be sugarcane, paddy rice, maize, or the like, for example.

Referring to FIGS. 3A, 4A, and 7A-7F, in some non-limiting embodiments, the phenology metrics may be different crop growth cycles among one or more cropland 208. By way of example, but in no way limiting, the following describes the phenology metrics that were calculated for the Guangxi Region. In some non-limiting embodiments, the multiple pixels of the second real-world locations within the geographic region 210 that are classified as at least one particular type of cropland 300 may be identified as single, double, or triple cropping croplands. In some non-limiting embodiments, a NDVI temporal profile 470 analysis may be used to identify cropping intensity patterns of the at least one particular type of cropland 300. NDVI may increase from a green-up stage and reach the maximum threshold during the peak growing stage. After an identified cropland 300 matures, NDVI may be reduced until the at least one particular type of cropland 300 is harvested. Meanwhile, bare soils and crop residuals after cropland harvest usually have very low values of LSWI, which may be employed as crop harvest signals. In some non-limiting embodiments, NDVI time-series smoothed by an SG filter and the time series constructed of LSWI input may be used to identify the phenology metrics of start 472, peak 474, and end 476 of the crop growth cycles for individual pixels of the at least one particular type of cropland 300. The identification of the phenology metrics of start 472, peak 474, and end 476 of the crop growth cycles for individual pixels of the at least one particular type of cropland 300 comprise a peak finding method to flag the potential peaks 474 and troughs 478 along the NDVI temporal profiles 470. The identification of potential troughs 478 between two successive peaks 474, and calculating the number of peaks 474 to generate the map 450 (e.g., annual map) of single-cropping cropland 208, a double-cropping cropland 208, and triple-cropping cropland 208. The single-cropping cropland 208 indicates a single crop within a year. The double-cropping cropland 208 indicates two crops within a year. The triple-cropping cropland 208 indicates three crops within a year. A single-cropping cropland 208 having one peak 474. A double-cropping cropland 208 having two peaks 474. A triple-cropping cropland 208 having three peaks 474. A peak 474 may be defined as the time with NDVI value higher than the previous and the following values, while a trough 478 may be defined as the opposite case. The at least one particular type of cropland 300 generally has high peak values in NDVI that can exceed 0.5. In some non-limiting embodiments, the high peak values in NDVI that exceed 0.5 were used to exclude the spurious, i.e., false, peaks 474. The identification of potential troughs 478 between two successive peaks 474 may comprise the detecting of one or more bare soil signal determining two continuous peaks 474. The two continuous peaks 474 may be divided into two crop growth cycles.

By way of example, but in no way limiting, bare soils of the Guangxi Region may be detected by using LSWI. In some non-limiting embodiments, the LSWI of bare soils vary between 0 to 0.2, depending on the soil moisture content from northern to southern China. Therefore, a dynamic LSWI threshold ($T_{LSWI}$) calculated by the equations 5 and 6 was used to separate the cropping intensity in this study.

$$T_p = LSWI_{min} + (LSWI_{max} - LSWI_{min}) \times 0.15 \quad \text{(Eq. 5)}$$

$$T_{LSWI} = \begin{cases} 0, & T_p < 0 \\ T_p, & 0 \le T_p \le 0.2 \\ 0.2, & T_p > 0.2 \end{cases} \quad \text{(Eq. 6)}$$

$T_p$ is the potential LSWI threshold, and $T_{LSWI}$ is the final LSWI threshold that may be used to identify the bare soil signals. $LSWI_{min}$ and $LSWI_{max}$ are the minimum and maximum LSWI values. In some non-limiting embodiments, the number of peaks 474 may be generated to generate the map 450 (e.g., an annual map) of single-cropping cropland 208, a double-cropping cropland 208, and triple-cropping cropland 208.

Figure 5:
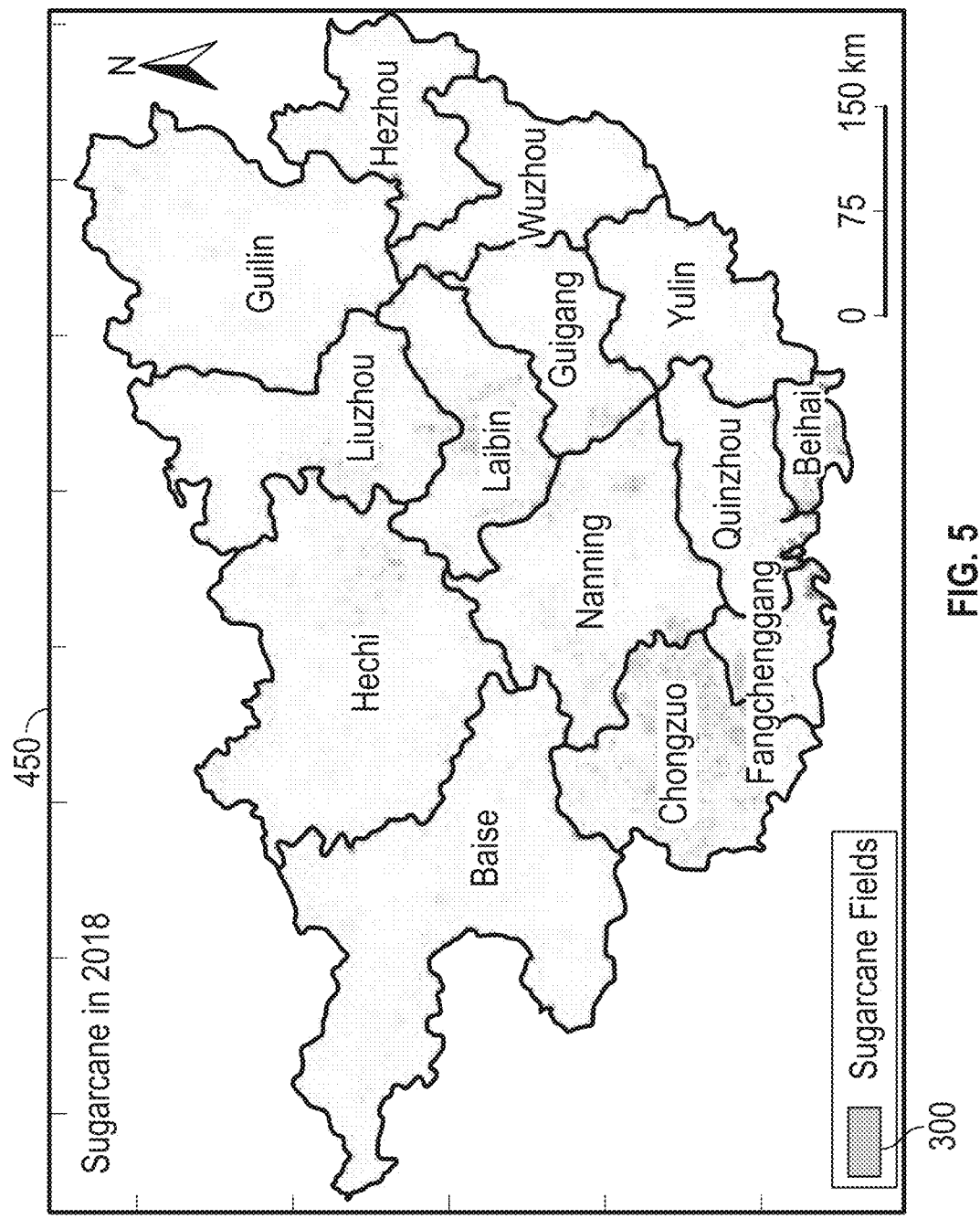
FIG. 5 illustrates an image of a map of at least one particular type of cropland in accordance with aspects of the present disclosure.
Figure 6D:
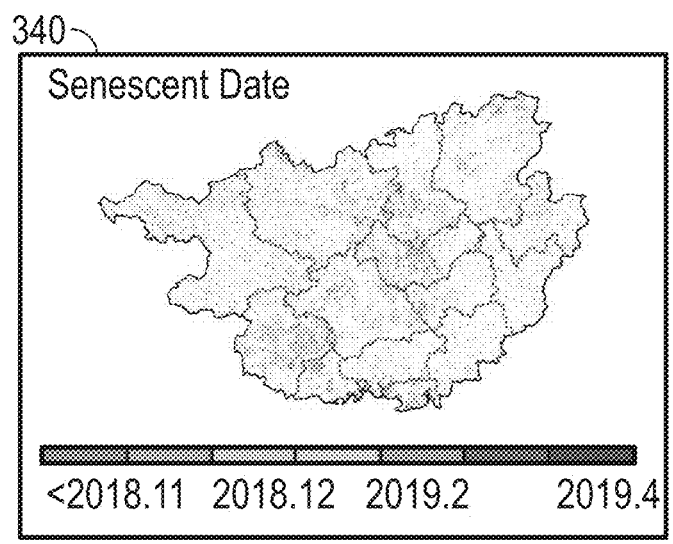
Figure 6E:
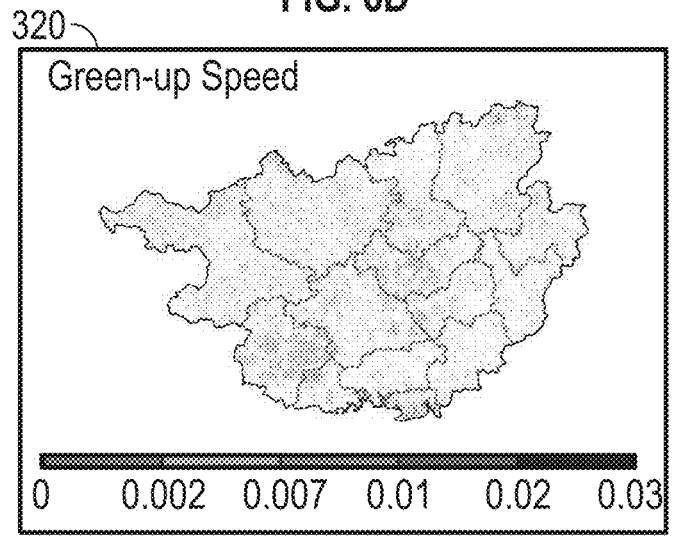
Figure 6F:
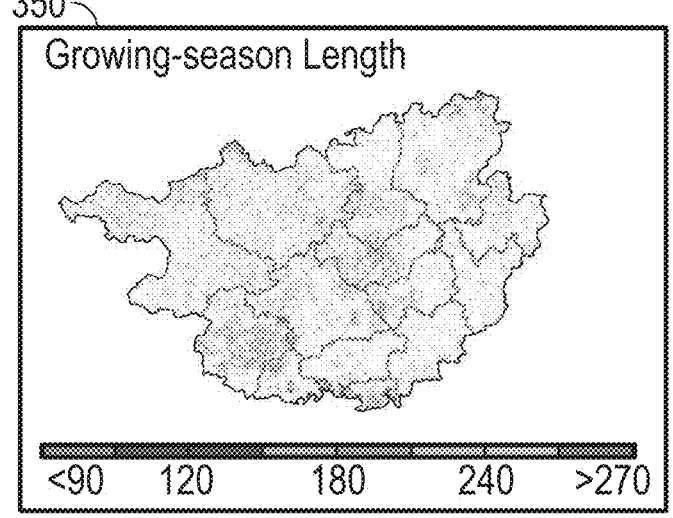
Figure 7A:
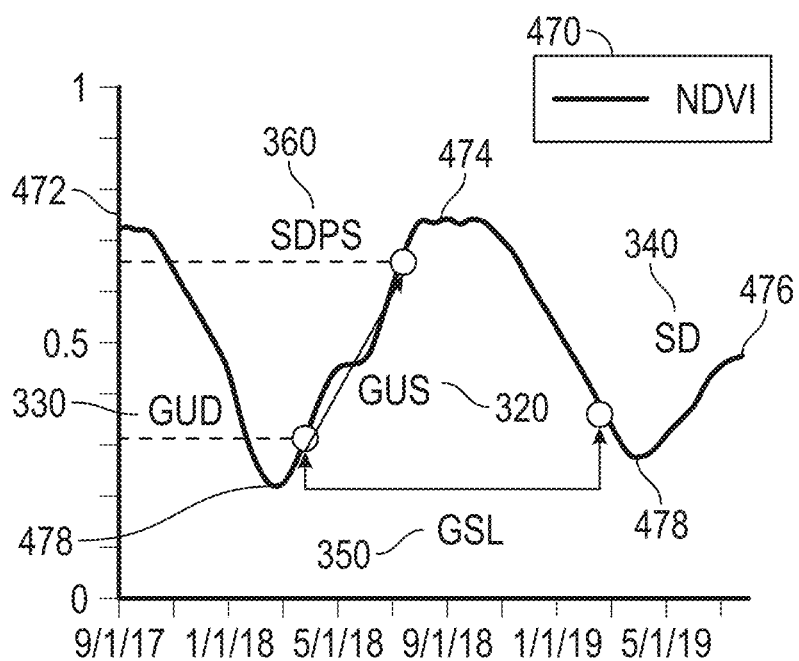
FIG. 7A is a graph shows an NDVI temporal profile for a sugarcane crop from Sep. 17, 2001 to Jul. 1, 2019 annotated with phenology parameters based on the NDVI curve, including green-up date (GUD, left 10% level), start date of peak season (SDPS, left 90% level), senescent date (SD, right 10% level), green-up speed (GUS, slop from green up to start of peak season), and the growing-season length (GSL).
Figure 7B:
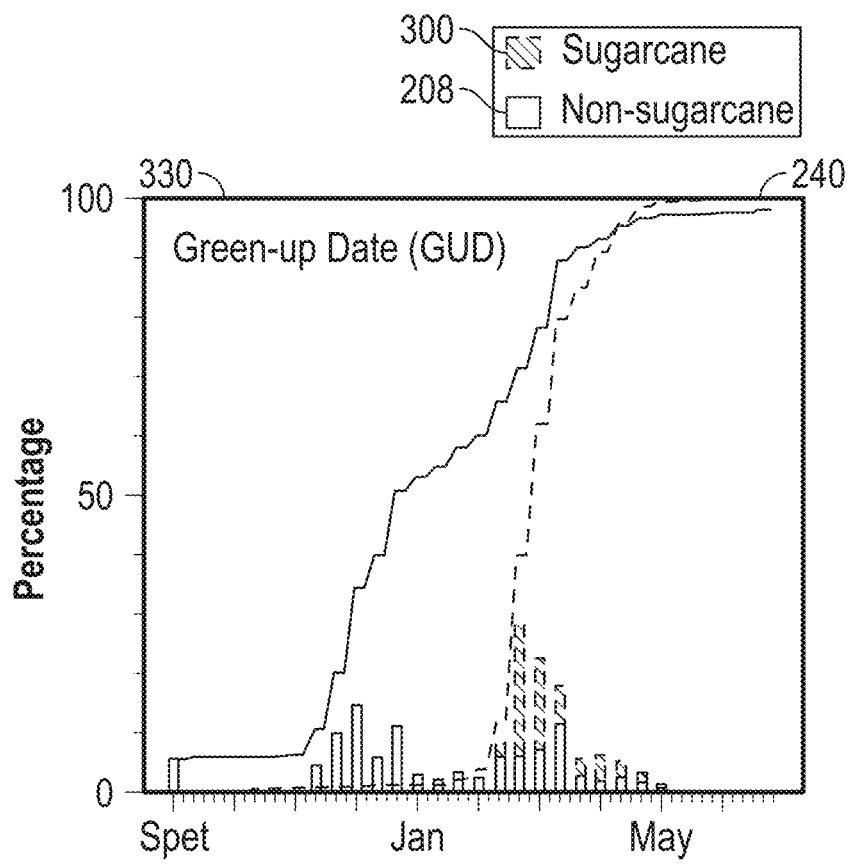
FIGS. 7B-7F are exemplary diagrams illustrating signature analysis of sugarcane and non-sugarcane crops at each phenology parameter layer using the histogram statistics method.
Figure 7C:
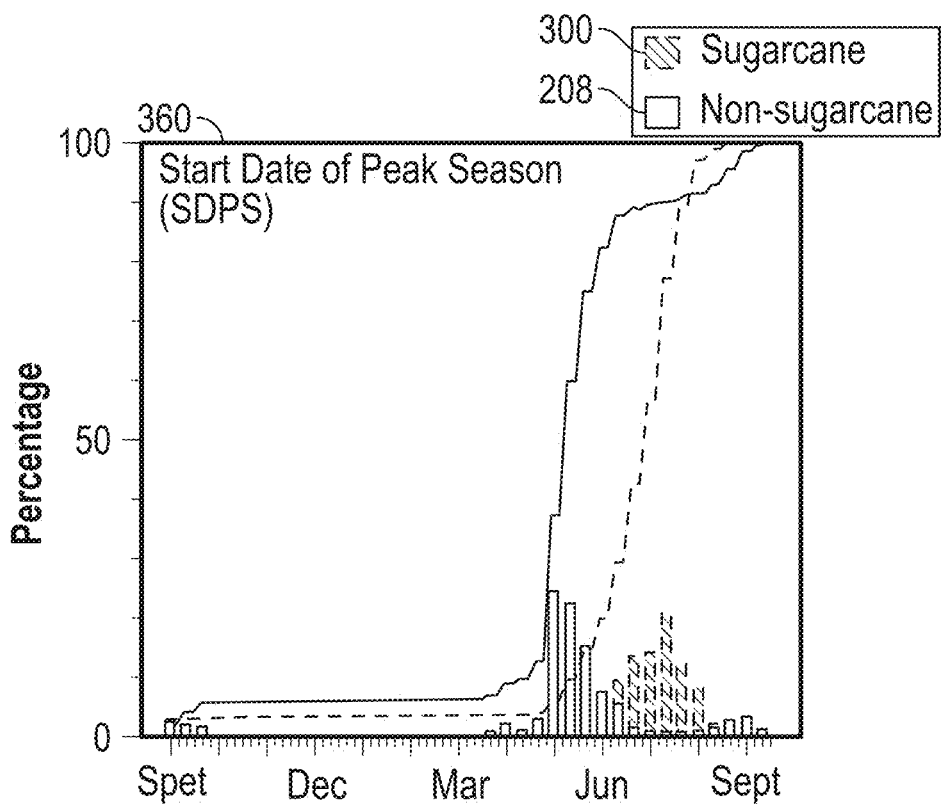
Figure 7D:
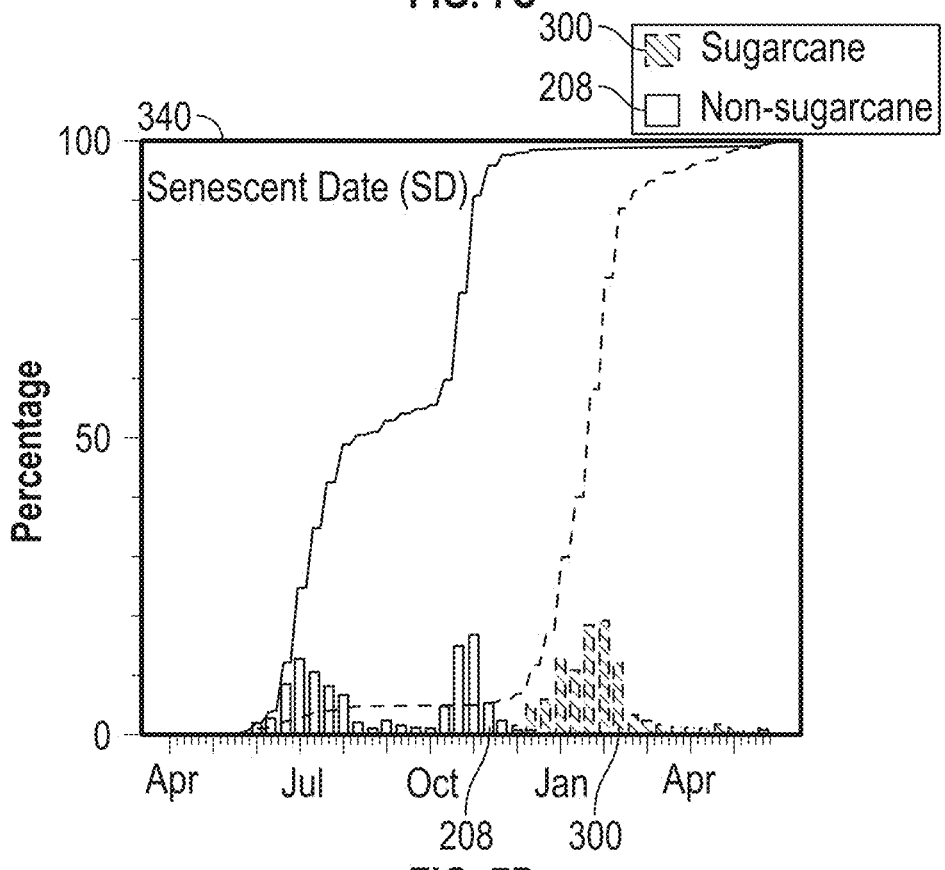
Figure 7E:
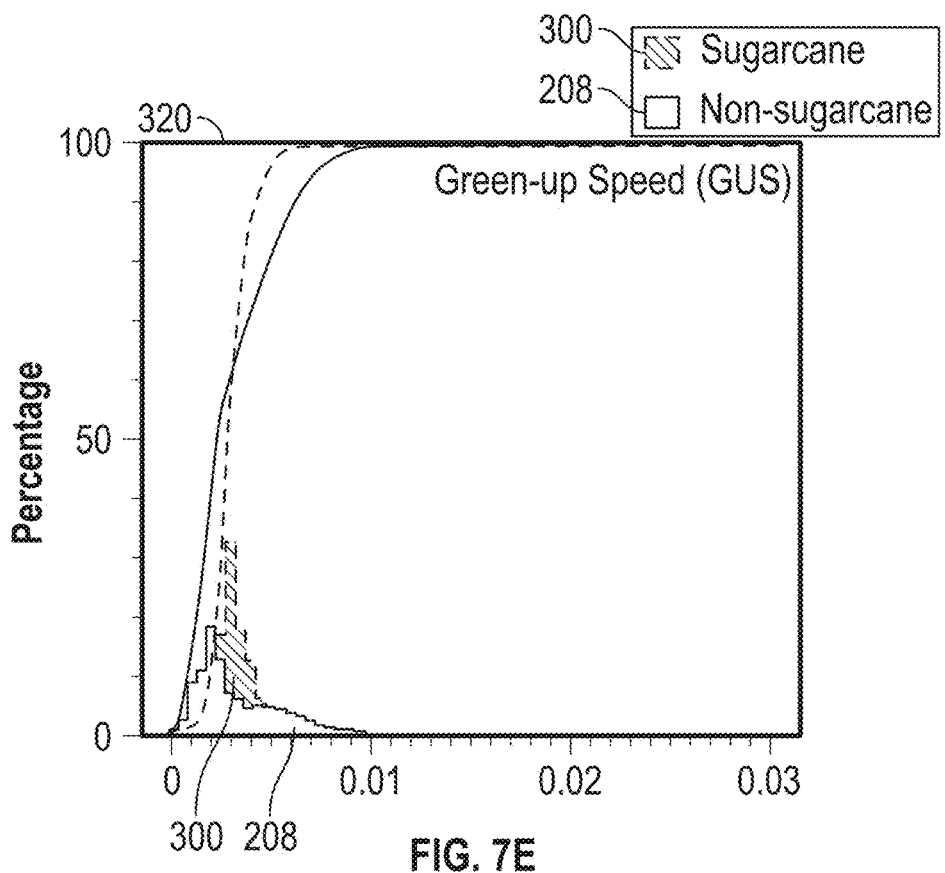
Figure 7F:
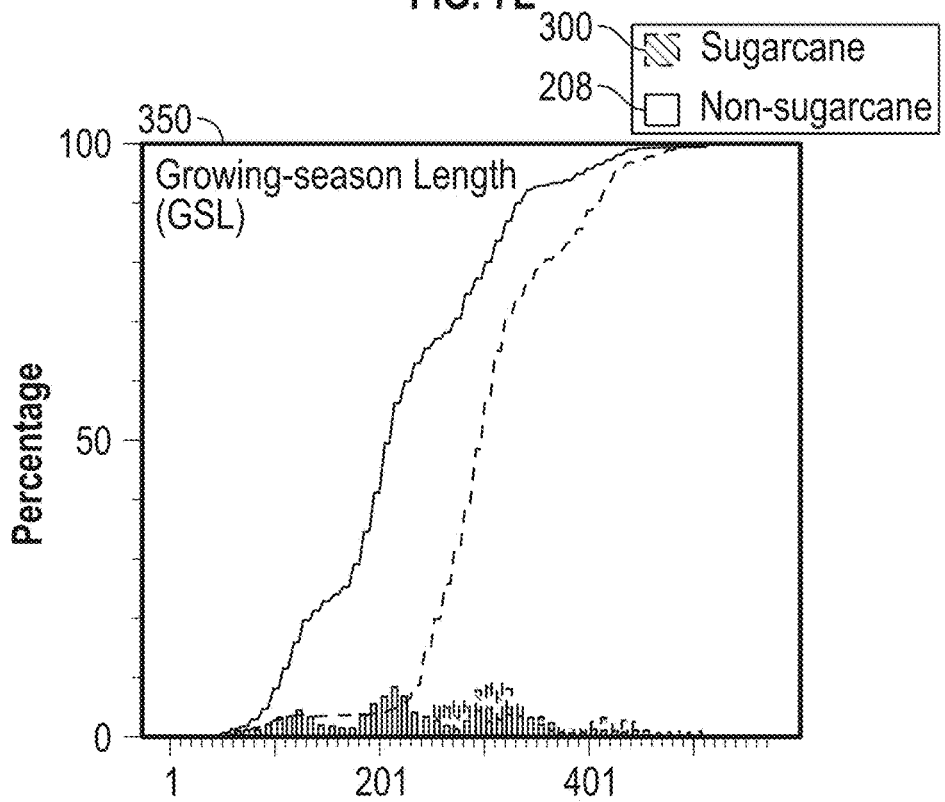
Figure 8D:
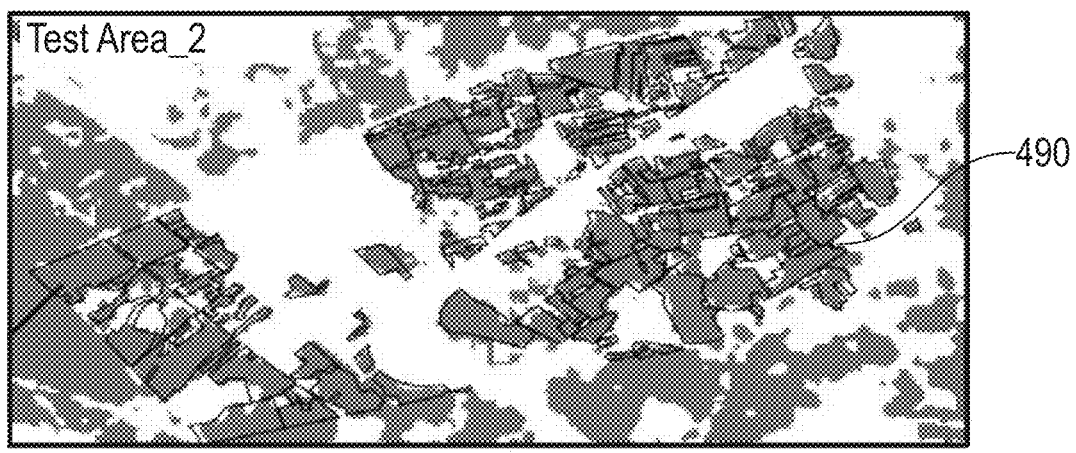
Figure 8E:
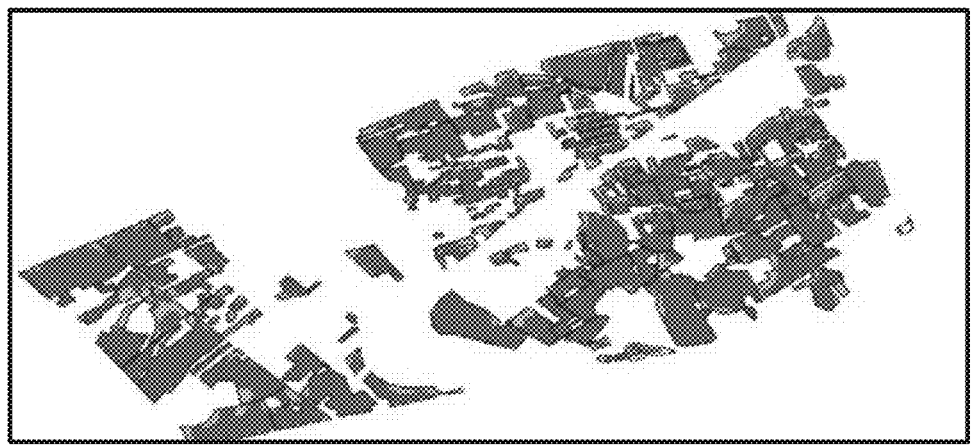
Figure 8F:
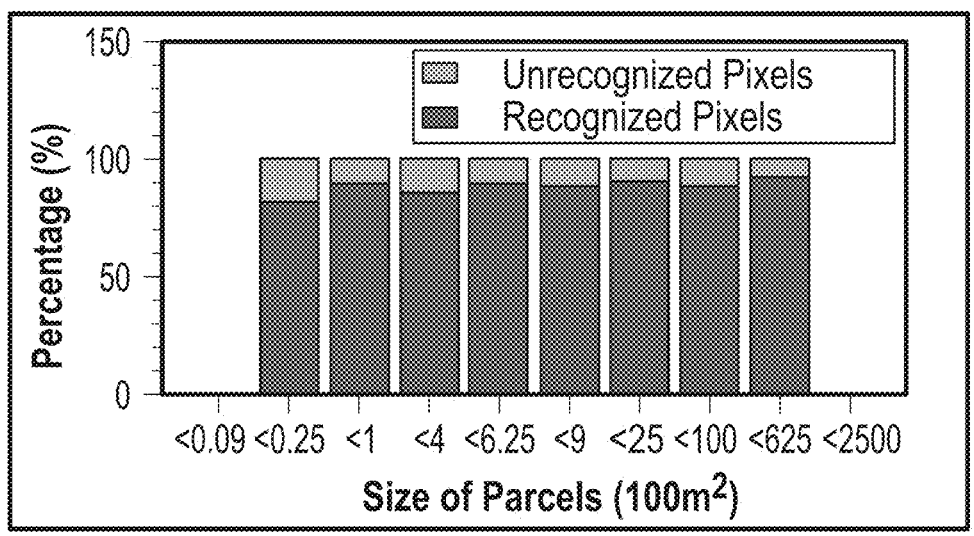
FIG. 8F is a chart showing proportions of recognized and unrecognized pixels with the changes of sugarcane field sizes.

As seen in FIG. 5, the map 450 may be generated by identifying multiple pixels within the pixel map representing second real-world locations as at least one particular type of cropland 208. As disclosed in FIGS. 6A-6F and FIG. 7A-7F, phenology metrics of the at least one particular type of cropland 300 may include crop growth cycles per year, green-up speed (GUS) 320, FIGS. 6E and 7E), green-up date 330, i.e., the start of the season (GUD, FIGS. 6B and 7B); senescent date 340; i.e., the end of the season (SD, FIGS. 6D and 7D), growing season length 350 (GSL, FIGS. 6F and 7F), and start date of peak season 360 (SDPS, FIGS. 6C and 7C).

Referring to FIGS. 5-7F, in some non-limiting embodiments, the method 100 further comprises generating a map 450 of sugarcane cropland by classifying multiple pixels within the pixel map indicative of the second real-world locations determined to be sugarcane cropland via phenology metrics. By way of example, but in no way limiting, the phenology metrics of the sugarcane cropland in the Guangxi Region include the green-up date 330 (GUD, or start of the season), senescent date 340 (SD, or end of the season), growing season length 350 (GSL), start date of peak season 360 (SDPS), and green-up speed 320 (GUS). As shown in FIGS. 6A-7F, the phenology metrics of the sugarcane cropland include a single cropping cycle in a year; the growing season length 350 of sugarcane cropland is longer than other major crops in the Guangxi Region; and sugarcane cropland is planted by cuttings not seeds, which could lead to a different green-up speed 320 (GUS) from other crops at the beginning of the growing season. The phenology metrics of sugarcane cropland may also be defined by using the algorithms and NDVI time series. The GUD 330 and SDPS 360 phenology metrics may be defined as the times of NDVI reaching 10% and 90% of the NDVI amplitude from the left minimum. The SD 340 phenology metric may be the time of NDVI having 10% amplitude higher than the right minimum. The GSL 350 phenology metric may represent the days between green-up date and senescent date. The GUS 320 phenology metric may be the ratio of the NDVI change over the number of days between GUD 330 and SDPS 360. By way of example, FIGS. 7A-7F illustrate the detailed information of the phenology metrics of sugarcane cropland versus non-sugarcane cropland.

In some non-limiting embodiments, training samples of sugarcane cropland and other at least one particular type of cropland 300 may be overlaid with the phenology metrics to carry out a signature analysis. The results in this non-limiting example illustrate that the GUD 330 of sugarcane cropland occurs mostly in late January to late April, in other words, day of year (DOY) from 20 to 110. SDPS 360 is in early May to middle August (DOY from 120 to 230), and SD 340 starts early November with DOY larger than 310. The GUS 320 mainly gathers between 0.002 to 0.007. GSL 350 of sugarcane crops are mostly larger than 240 days.

Based on the results of signature analysis of sugarcane cropland, a decision classification analysis approach of 20<GUD<110 & 120<SDPS<230 & SD>310 & 0.002<GUS<0.007 may be implemented to identify multiple pixels as sugarcane cropland pixels among the multiple pixels categorized as at least one particular type of cropland 300 with a single cropping cycle system. The identified multiple pixels identified as sugarcane cropland pixels are used to generate a map 450 of the sugarcane cropland within the second real-world locations.

The method may further comprise an accuracy assessment of the map generated of the at least one particular type of cropland 300 within the second real-world locations. By way of example, but in no way limiting, ground reference data may be collected and used with stratified random sampling methods to provide for the accuracy assessment. For example, ground reference data was collected for the Guangxi Region in 2018 and was used with the stratified random sampling method for the accuracy assessment based on multiple information sources. The national land-use land cover map of China in 2015 was used as a basis to generate at least one land cover mask 200; i.e., water-related land cover type 202, non-vegetated land cover type 204, and evergreen land cover type 206, and the remaining multiple pixels in the pixel map identified as cropland 208 in the Guangxi Region. Within the at least one land cover mask 200 and/or the cropland 208, random points were generated having square buffers at a distance of 30-m. The 30-m distance was comparable to the spatial resolution of the LC/S2 data and field size of the cropland 208 in the Guangxi Region. Sugarcane cropland and non-sugarcane cropland were identified by overlaying the square buffers having high spatial resolution images within Google Earth and Sentinel-2 images from 2018. One or more ground field photo in the Guangxi Region was used as an auxiliary reference in a visual procedure. As an example, as seen in FIG. 8A-F, validation samples were collected, the validation samples comprising 203 polygons (8,033 pixels) for sugarcane cropland 485 and 762 polygons (30,175 pixels) for non-sugarcane cropland 490. The validation samples were used to assess the accuracy of the map of sugarcane cropland in 2018 by calculating the confusion matrix following a best practices method.

In some non-limiting embodiments, the method may further comprise an accuracy assessment of the map generated of the at least one particular type of cropland within the second real-world locations by calculating planted areas for the at least one particular type of cropland for all prefectures and cities in a geographic area. By way of example, but in no way limiting, the results of calculating of the sugarcane cropland planted areas from the 2018 sugarcane cropland map for all prefectures and cities in Guangxi Region were compared with the statistical data of sugarcane cropland planted area reported by Guangxi Bureau of Statistics for 2018. This cross-comparison was to evaluate the agreements between the remote sensing approach and the agricultural statistics approach at prefecture and city level.

As discussed above, there has been a need to develop a new phenology-based system and method to identify and map one particular type of cropland from diverse cropland types across local, state and country scales. The present disclosure by way of example, but in no way limiting, addresses these deficiencies with a methodology, which utilizes multiple pixels from images depicting real-world locations collectively having pixel information selected from a group consisting of colors within a visible spectrum, infra-red, and shortwave infrared to calculate a plurality of vegetation indices with combinations of the pixel information. The vegetation indices are utilized to identify portions of the geographic region indicative of cropland, and then phenology analysis is used to analyze the geographic regions indicative of cropland to specifically identify the type of cropland.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

What is claimed is:

1. A computer system comprising:
   at least one processor; and
   at least one non-transitory computer-readable medium storing a set of instructions for running on the at least one processor, that when executed cause the at least one processor to:
   receive first image data of a geographic region, the first image data having pixels and being geo-referenced such that each pixel has a known real-world location within the geographic region associated with the pixel, the image data including multiple pixels for real-world locations within the geographic region, the multiple pixels for the real-world locations collectively having pixel information selected from a group consisting of colors within a visible spectrum, infra-red, and shortwave infrared;
   calculate for particular real-world locations within the geographic region, a plurality of vegetation indices with combinations of the pixel information;
   generate at least one land cover mask with the vegetation indices, the at least one land cover mask identifying first real-world locations within the geographic region having a water-related land cover type, a non-vegetated land cover type and an evergreen land cover type;
   classify second real-world locations within the geographic region that are not classified as the water-related land cover type, the non-vegetated land cover type and the evergreen land cover type as cropland; and
   analyze a time-series of image data depicting the second real-world locations within the geographic region with phenology metrics to identify at least one particular type of cropland within the second real-world locations.

2. The computer system of claim 1, wherein the colors within the visible spectrum include red, green and blue.

3. The computer system of claim 1, wherein the at least one particular type of cropland within the second real-world locations is sugarcane.

4. A method, comprising:
receiving first image data of a geographic region with one or more processor, the first image data having pixels and being geo-referenced such that each pixel has a known real-world location within the geographic region associated with the pixel, the image data including multiple pixels for real-world locations within the geographic region, the multiple pixels for the real-world locations collectively having pixel information selected from a group consisting of colors within a visible spectrum, infra-red, and shortwave infrared;
calculating for particular real-world locations within the geographic region with the one or more processor, one or more vegetation index with combinations of the pixel information;
generating at least one land cover mask with the one or more vegetation index with the one or more processor, the at least one land cover mask identifying first real-world locations within the geographic region having a water-related land cover type, a non-vegetated land cover type and an evergreen land cover type;
classifying second real-world locations within the geographic region that are not classified as the water-related land cover type, the non-vegetated land cover type and the evergreen land cover type are identified as cropland via the one or more processor; and
analyzing a time-series of image data with one or more processor depicting the second real-world locations within the geographic region with phenology metrics to identify at least one particular type of cropland within the second real-world locations.

5. The method of claim 4, wherein the colors of the visible spectrum comprising red, green pixel, and blue.

6. The method of claim 4, wherein the at least one particular type of cropland within the second real-world locations is sugarcane cropland.

7. The method of claim 4, further comprising analyzing with training samples a signature of the at least one particular type of cropland within the second real-world locations.

8. The method of claim 7, further comprising generating a pixel map for at least a portion of the geographic region, the pixel map having pixels indicative of the second real-world locations, and classifying at least one pixel within the pixel map as at least one particular type of cropland.

9. The method of claim 8, further comprising generating a map from the pixel map.

10. The method of claim 9, wherein the map is a sugarcane cropland map.

11. The method of claim 4, further comprising receiving from a second source second image data of a geographic region with one or more processor, the second image data having pixels and being geo-referenced such that each pixel has a known real-world location within the geographic region associated with the pixel, the second image data including multiple pixels for real-world locations within the geographic region, the multiple pixels for the real-world locations collectively having pixel information selected from a group consisting of colors within a visible spectrum, infra-red, and shortwave infrared.

12. A method, comprising:
receiving, by at least one processor, first image data from a first source; the first image data including a plurality of images with each image having pixels geo-referenced such that each pixel has a known real-world location within a pre-determined geographic region associated with the pixel;
determining, by the at least one processor, vegetation indices using the first image data;
generating, by the at least one processor, a plurality of land cover masks for the pre-determined geographic region using the vegetation indices, the plurality of land cover masks including water-related land cover type, non-vegetated land cover type, and evergreen land cover type; and,
determining, by the at least one processor, at least one cropland within the pre-determined geographic region using location of the water-related land cover type, the non-vegetated land cover type, and the evergreen land cover type.

13. The method of claim 12, wherein determination of vegetation indices includes using the first image data to determine Normalized Difference Vegetation Index, Enhanced Vegetation Index, Land Surface Water Index, and a Modified Normalized Difference Water Index.

14. The method of claim 12, further comprising the steps of:
identifying, by the at least one processor, first image data having at least one obstruction; and,
removing, by the at least one processor, first image data having the at least one obstruction from the first image data.

15. The method of claim 14, further comprising the steps of:
receiving, by the at least one processor, second image data from a second source, the second source different from the first source, the second image data including a plurality of images with each image having pixels geo-referenced such that each pixel has a known real-world location within the pre-determined geographic region associated with the pixel, the second image data having at least one obstruction;
removing, by the at least one processor, second image data having the at least one obstruction; and,
assimilating, by the at least one processor, the first image data and the second image data into a first combination set of image data such that determination of vegetation indices includes determination of vegetation indices of the first combination set of image data.

16. The method of claim 15, further comprising the steps of: receiving, by the at least one processor, third image data from a third source, the third source different than the first source and the second source, the third image data including a plurality of images with each image having pixels geo-referenced such that each pixel has a known real-world location with the pre-determined geographic region associated with the pixel.

17. The method of claim 16, wherein the third image data includes only areas, determined by the at least one processor, to be cropland.

18. The method of claim 17, further comprising the step of applying, by the processor, phenology metrics to determine a first cropland and a second cropland, the first cropland being different than the second cropland.

19. The method of claim 17, further comprising the step of generating at least one map of the at least one cropland.

20. The method of claim 19, wherein the at least one cropland includes sugarcane.

* * * * *